(12) United States Patent
Suda

(10) Patent No.: US 6,359,551 B1
(45) Date of Patent: Mar. 19, 2002

(54) INDICATION DEVICE

(76) Inventor: Yoshimitsu Suda, 6-6 Chitose 1 Chome, Sumida-ku, Tokyo (JP)

( * ) Notice: Subject to any disclaimer, the term of this patent is extended or adjusted under 35 U.S.C. 154(b) by 0 days.

(21) Appl. No.: 09/674,625

(22) PCT Filed: Jun. 2, 1999

(86) PCT No.: PCT/JP99/02966
§ 371 Date: Nov. 3, 2000
§ 102(e) Date: Nov. 3, 2000

(87) PCT Pub. No.: WO00/00769
PCT Pub. Date: Jan. 6, 2000

(30) Foreign Application Priority Data

Jun. 30, 1998 (JP) ............................................. 10-199803

(51) Int. Cl.[7] .................................................. B62J 3/00
(52) U.S. Cl. ........................ 340/432; 340/427; 340/429; 362/473
(58) Field of Search ................................. 340/432, 427, 340/429, 331, 815.45, 815.83, 815.86; 362/473, 464, 491

(56) References Cited

U.S. PATENT DOCUMENTS

| | | | |
|---|---|---|---|
| 4,847,735 A | * 7/1989 | Kawasaki | 340/432 |
| 5,053,930 A | * 10/1991 | Benavides | 362/491 |
| 5,286,244 A | * 2/1994 | Wright et al. | 482/108 |
| 5,349,920 A | * 9/1994 | Koizumi | 116/28 R |
| 5,418,697 A | * 5/1995 | Chiou | 362/473 |
| 5,800,039 A | * 9/1998 | Lee | 340/432 |

FOREIGN PATENT DOCUMENTS

| | | |
|---|---|---|
| JP | 54-151902 | 6/1981 |
| JP | 62-169444 | 5/1989 |
| JP | 5-325601 | 12/1993 |
| JP | 9-190703 | 7/1997 |

* cited by examiner

Primary Examiner—Van T Trieu
(74) Attorney, Agent, or Firm—Jordan and Hamburg LLP

(57) ABSTRACT

An indication device of the present invention includes a case body provided to a movable portion during in use by a both-sided adhesive tape or a fitting; luminous body provided with the case body and emits a light or a blinking light by using electric current generated in a power source; a first ON/OFF switch with an optical sensor interposed between the power source and luminous body, and a second ON/OFF switch turning on automatically during use. Therefore, the indication device can allow the others to become aware of person's whereabouts by emitting light or blinking light when in use. The device can be turned off automatically to prevent dissipation of power.

21 Claims, 30 Drawing Sheets

Centrifugal Force          Centrifugal Force

INDICATION DEVICE

BACKGROUND OF THE INVENTION

The present invention relates to an indication device allowing other people to become aware of a person's whereabouts when users of the device go out during darkened time, or in a dark area or the like.

A known application directed to attach to a bicycle using goods such as a reflecting surface is characterized that is can become aware of bicycle's location to others by the reflection of lights such as streetlight, headlight of a vehicle or the like.

In the conventional indication device, a reflector is used, so that the cost has heretofore been very low, however it is dangerous in that when no light shines on the reflector, no light is reflected by the reflector.

SUMMARY OF THE INVENTION

For the purpose of overcoming the forgoing disadvantages, it is an object of the present invention to provide an indication device that allows others to become aware of person's whereabouts by emitting light or blinking light when in use. It is another object of the present invention to provide an indication device that can be turned off automatically and prevent dissipation of energy of the power source.

The novel features which are believed to be characteristic of the invention, both as to its organization and method of operation, together with further objects and advantages thereof, are described below with reference to the accompanying drawings in which a presently preferred embodiment of the invention is illustrated as an example.

It is to be expressly understood, however, that the drawings are for the purpose of illustration and description only, and are not intended as a definition of the limits of the invention.

An indication device comprises a case body provided on a movable portion during use by a tape or an attachment; a luminous body which is provided in the case body and emits light or blinking light by using electric current generated in a power source; and an ON/OFF switch interposed between the power source and luminous body, the ON/OFF switch turning on automatically during use. Therefore, the luminous body lights or blinks automatically when in use, so that the users do not switch the light or blinking light off, thus, dissipation of the power source can be prevented. The users also can use the device for a long time. Further, because the case body can be mounted to a portion that moves in use easily, the device can be used comfortably. In addition, it allows the luminous body to emit a light or a blinking light when in use, so that they can use the device safely. The device has a simple structure so that it can be assembled easily.

In addition, an indication device may include a case body allowed at least one end portion thereof to project outwardly when a person grips the device; a luminous body which is provided with the case body and emits light or blinking light by using electric current generated in a power source; and an ON/OFF switch turning on automatically when gripped by hand.

DETAILED DESCRIPTION OF THE INVENTION

Figure 1:
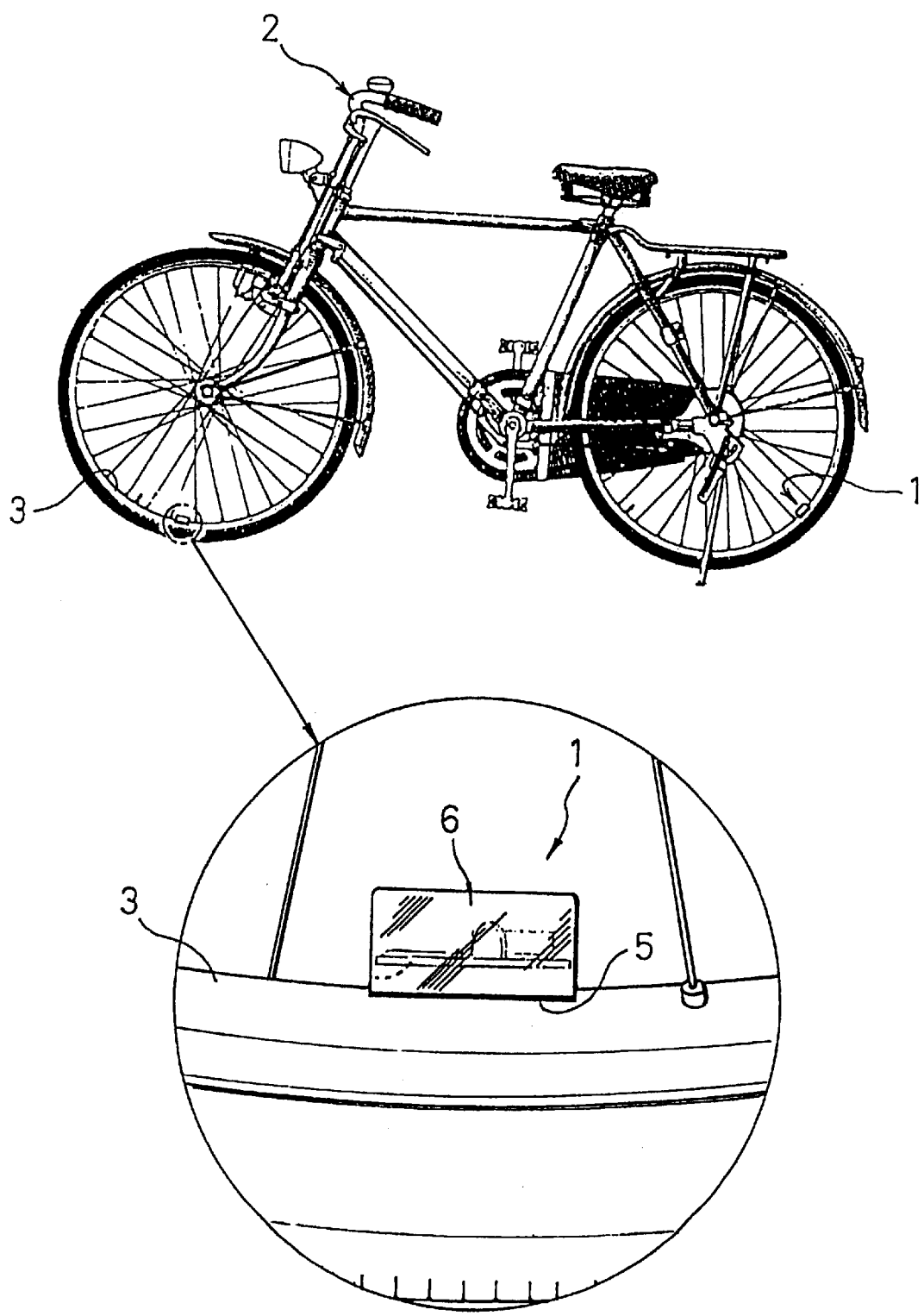
FIG. 1 is an explanatory view in use showing a first embodiment of the present invention.
Figure 2:
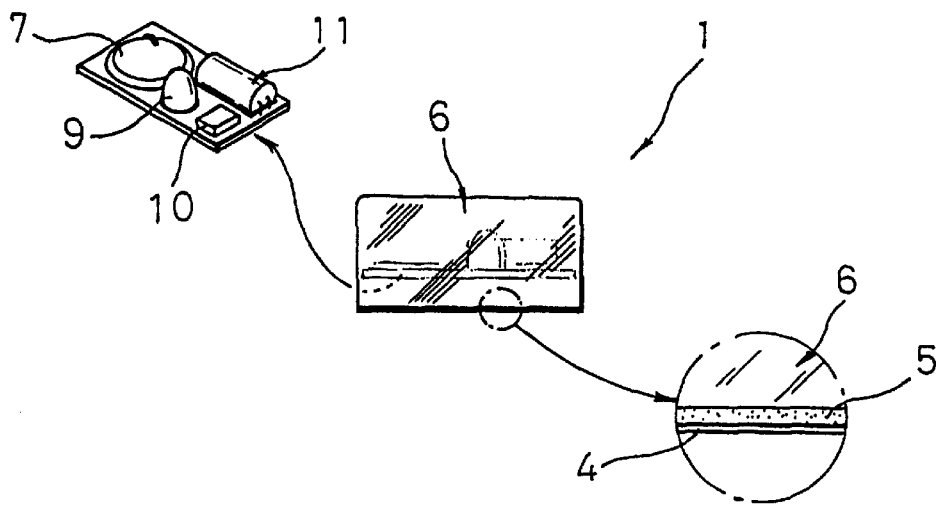
FIG. 2 is a front view showing the first embodiment of the present invention.
Figure 3:
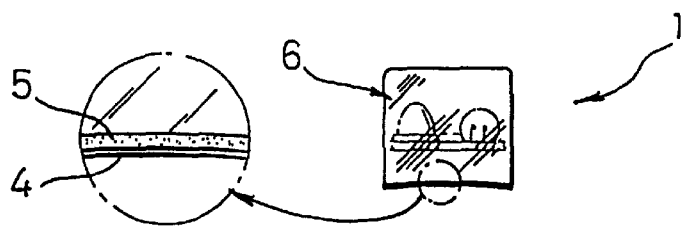
FIG. 3 is a side view showing the first embodiment of the present invention.
Figure 4:
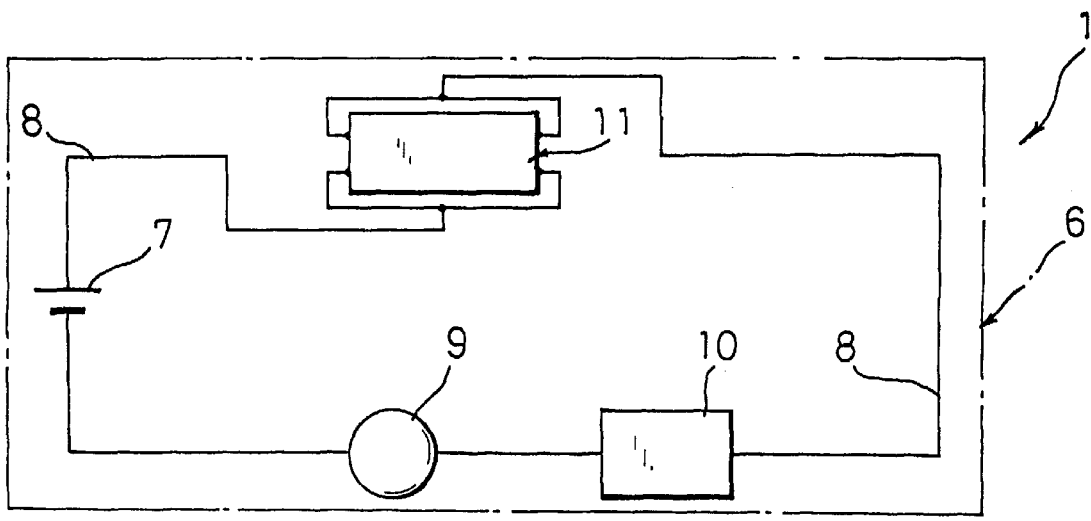
FIG. 4 is a block diagram showing the first embodiment of the present invention.

Best Mode for Carrying out the Invention

Preferred embodiments of the present invention will be described in detail referring to the accompanying drawings.

FIGS. 1 to 6 illustrate a first embodiment of the present invention in which are an indication device 1 of the present invention, the indication device 1 being attached to a wheel 3 of a bicycle 2. The indication device 1 comprises a case body 6, a battery 7, a luminous body 9, an ON/OFF switch 10 and an automatic switch 11. The case body 6 is adhered fixedly to the wheel 3, the case body 6 being stuck fixedly by a both-sided adhesive tape 5 covered by an exfoliation member 4 which is peeled off when adhering the case body to the wheel of the bicycle. The battery 7 defining a power source is provided into the case body 6. The luminous body 9 defining a Light Emitting Diode (LED) and the like is provided with the case body 6 in a wired manner by a wire 8 such that the luminous body 9 is allowed to light by using the electric current generated in the battery 7. The ON/OFF switch 10 includes an optical sensor that turns on automatically when it gets dark. Furthermore, the automatic switch 11 turns on automatically when the wheel 3 of the bicycle 2 rotates during use.

Figure 5:
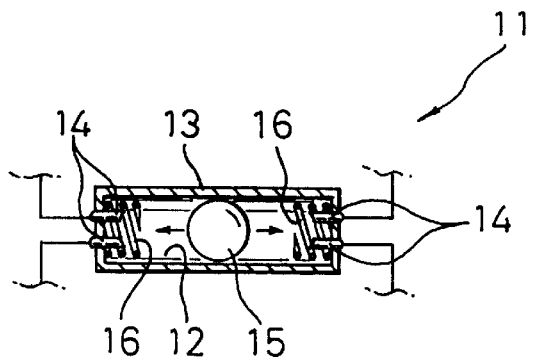
FIG. 5 is a cross sectional view of an automatic switch showing the first embodiment of the present invention.
Figure 6:
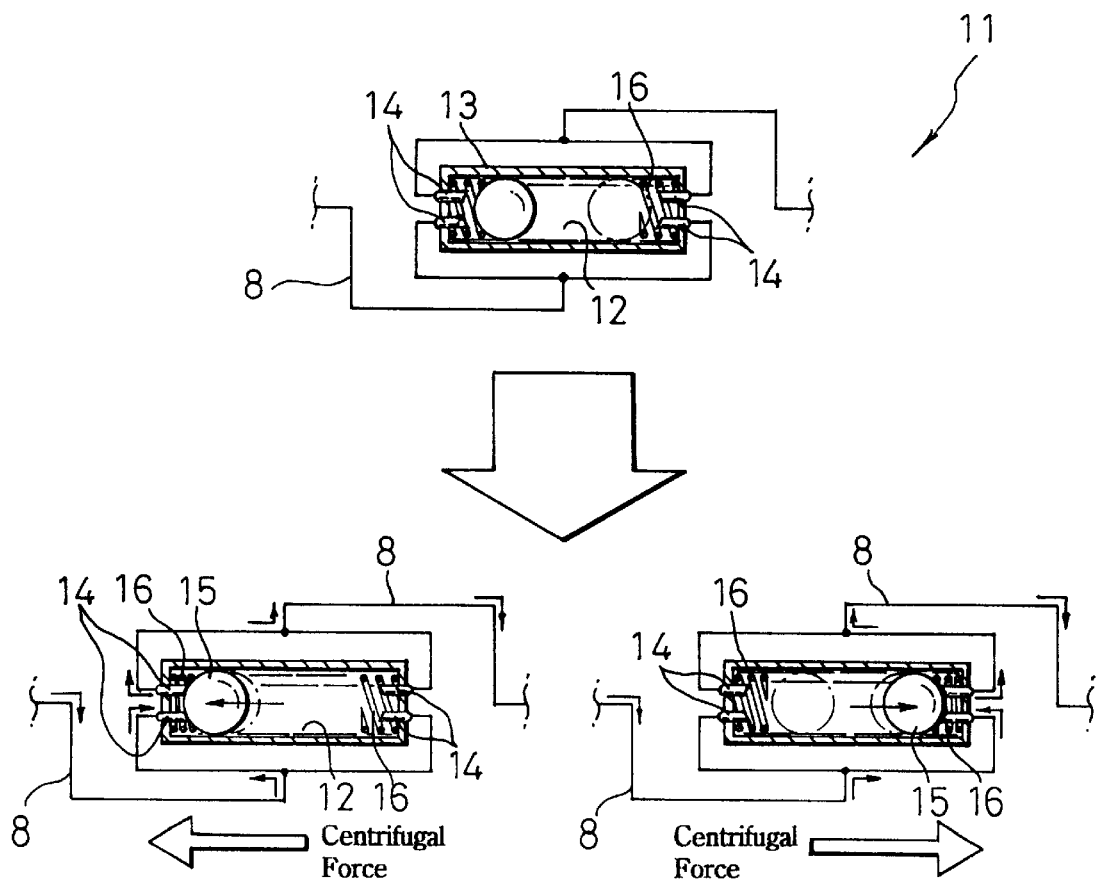
FIG. 6 is an explanatory view in operation of the automatic switch showing the first embodiment of the present invention.

As shown in FIGS. 5 and 6, the automatic switch 11 comprises a case 13, a pair of fixed contacts 14, 14, a movable contact 15 in the shape of a ball and spring members 16, 16. The case 13 is formed of insulation material and includes a cylindrical through hole 12 therein. The fixed contacts 14, 14 are provided at both ends of the through hole 12 of the case 13 respectively such that the fixed contacts protrude respectively. The movable contact 15 moves by sliding in the through hole 12 and can connect with each of the fixed contacts and conduct electricity with them respectively. The spring members 16, 16 can prevent conduction between the fixed contacts 14, 14 and the movable contact 15 respectively when no centrifugal force acts upon the movable contact 15.

In use, as shown in FIG. 1, after the exfoliation member 4 of the two-sided adhesive tape 5 is removed, the indication device 1 is attached fixedly to the wheel 3 of the bicycle 2 by the tape 5.

In the case that user rides on the bicycle 2, the luminous body 9 does not turn on because the ON/OFF switch turns off during the day. On the other hand, the ON/OFF switch turns on during the night, and the movable contact 15 presses either of the spring members 16, 16 and conducts to either of the fixed contacts 14, 14. After that, the automatic switch 11 is turned on.

Therefore, the electric current flows to the luminous body 9, and the luminous body 9 is switched on to light.

That is to say, the ON/OFF switch 10 and automatic switch 11 of the indication device 1 of the present invention turn off except when the wheel 3 is rotating and it is used at night, so that the luminous body 9 does not emit a light, and indication device 1 can be prevented from dissipating power of the battery 7.

Other Embodiments

Other embodiments of the present invention are described below with referring to FIGS. 7 to 57. Throughout the drawings of the embodiments, like components are denoted by like numerals as of the first embodiment and will not therefore be explained in greater detail.

Figure 7:
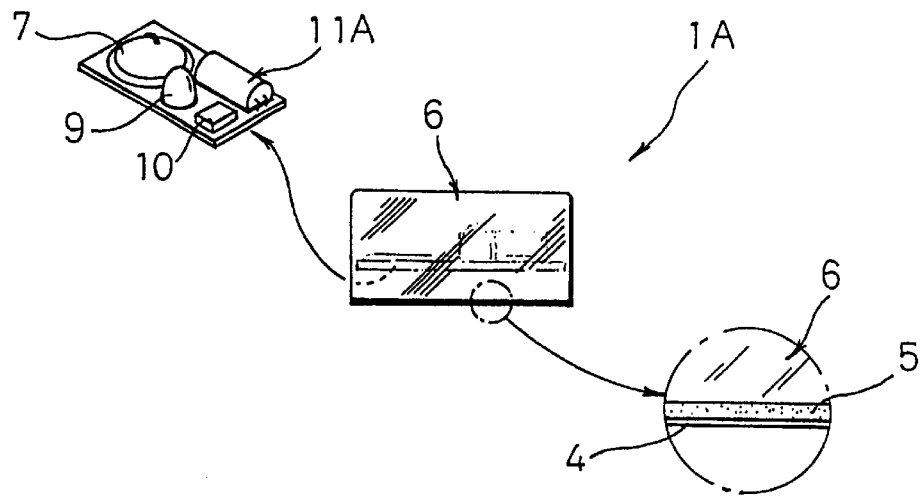
FIG. 7 is a front view showing a second embodiment of the present invention.
Figure 8:
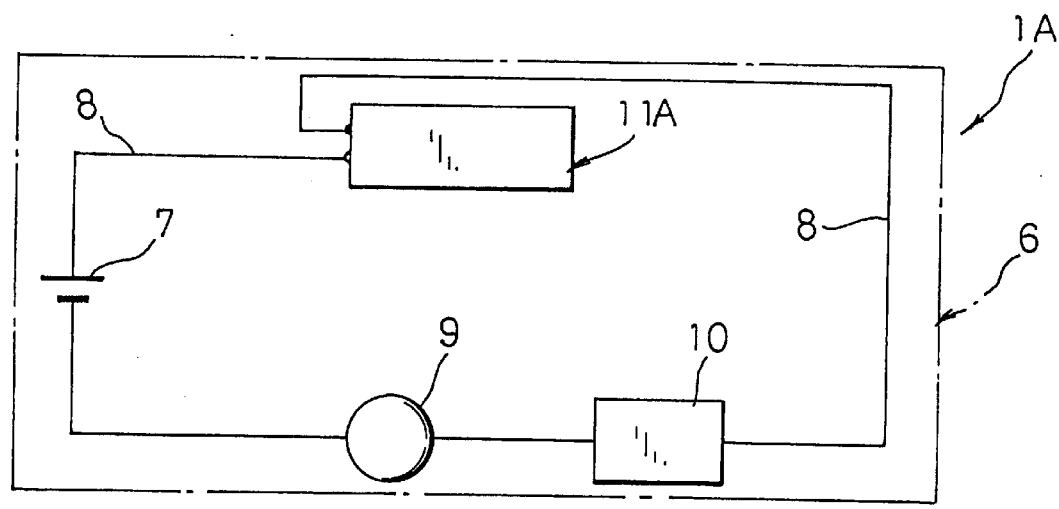
FIG. 8 is a block diagram showing the second embodiment of the present invention.
Figure 9:
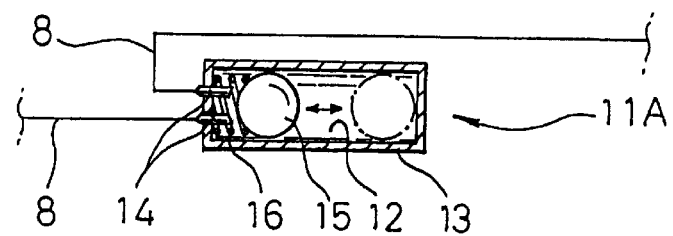
FIG. 9 is an explanatory view of an automatic switch showing the second embodiment of the present invention.

A second embodiment of the present invention is shown in FIGS. 7 to 9. It is distinguished from the first embodiment by the fact that the automatic switch 11 is replaced with another automatic switch 11A having a pair of fixed contacts 14. An indication device 1A with such device according to the first embodiment provides a function similar to the first embodiment save that the attached position is restricted.

Figure 10:
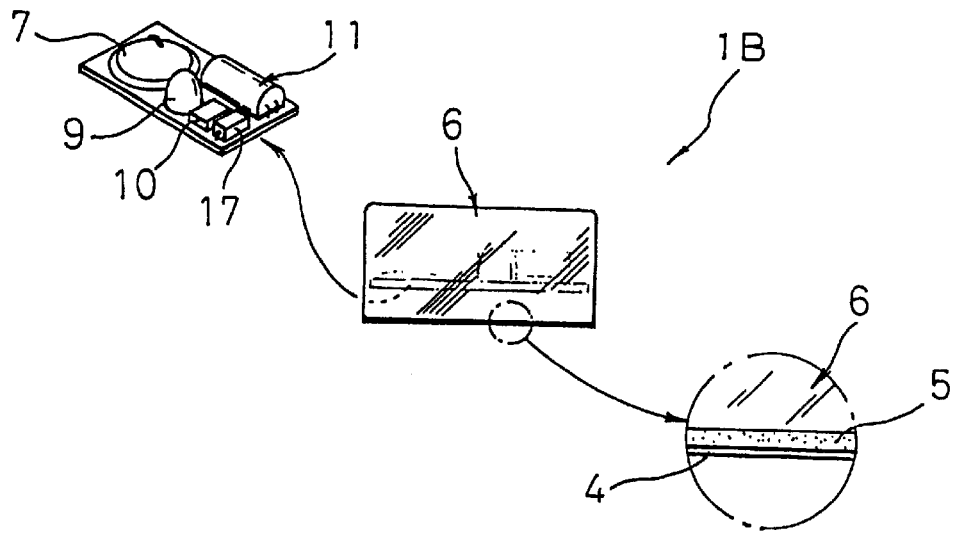
FIG. 10 is a front view showing a third embodiment of the present invention.
Figure 11:
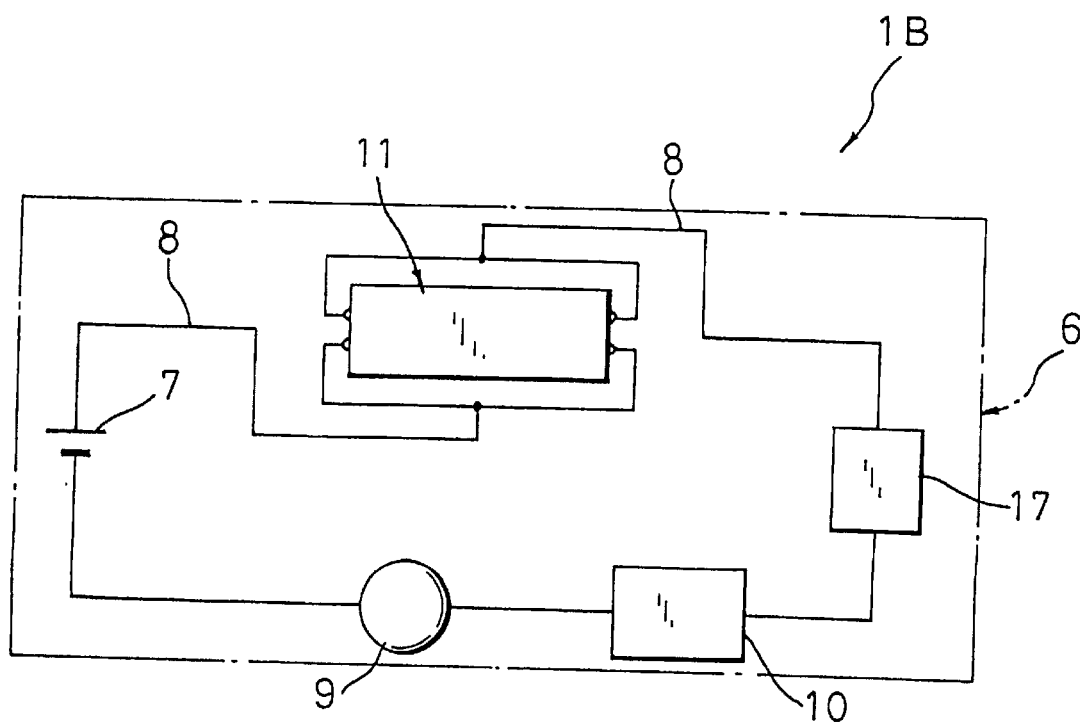
FIG. 11 is a block diagram showing the third embodiment of the present invention.

A third embodiment of the present invention is shown in FIGS. 10 and 11. It is distinguished from the first embodiment by the fact that the circuit for blinking 17 which allows the luminous body 9 to go on and off is interposed between the battery 7 and the luminous body 9. An indication device 1B with the circuit 17 can go on and off with the luminous body 9 in a blinking manner.

Figure 12:
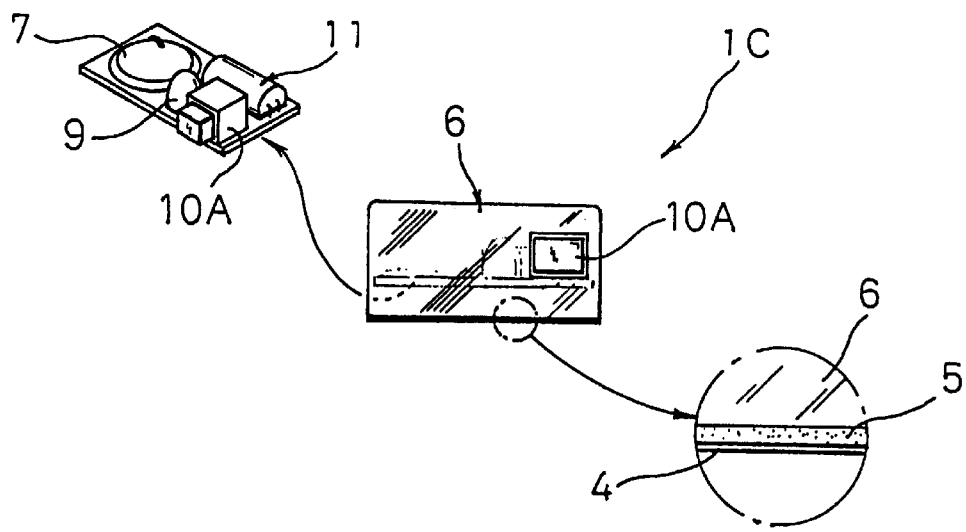
FIG. 12 is a front view showing a fourth embodiment of the present invention.
Figure 13:
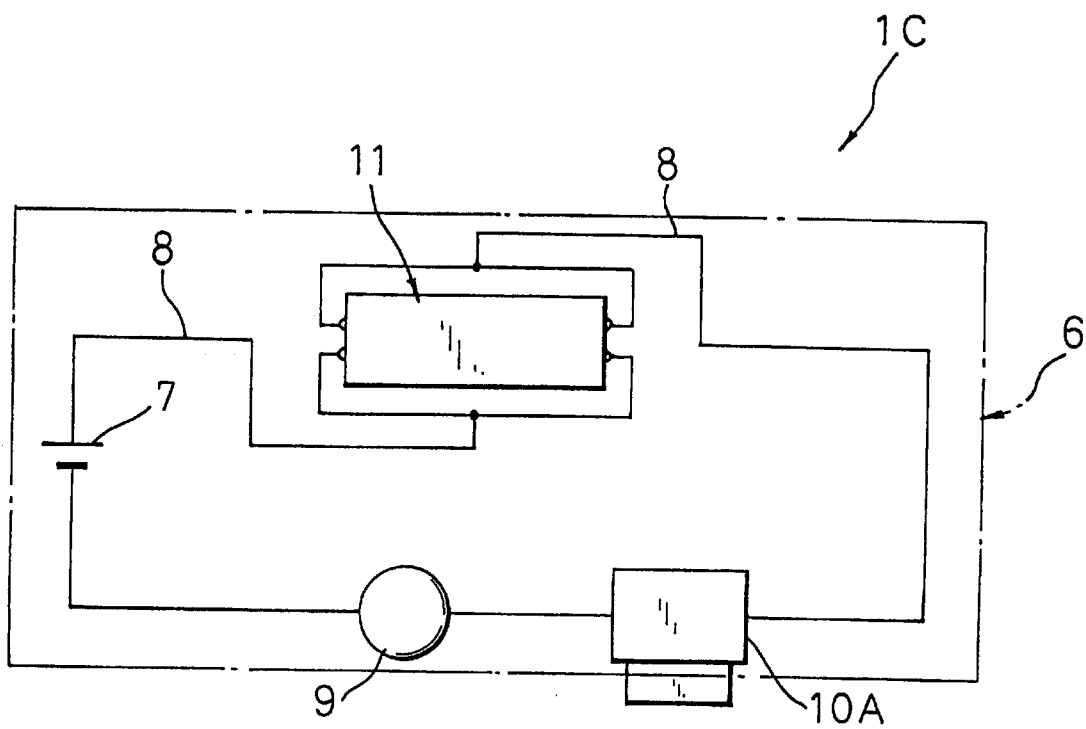
FIG. 13 is a block diagram showing the fourth embodiment of the present invention.

A fourth embodiment of the present invention is shown in FIGS. 12 and 13. It is distinguished from the first embodiment by the fact that the ON/OFF switch 10 is replaced with another switch 10A. The ON/OFF switch 10A is turned on and off by hand. An indication device 1C with the ON/OFF switch 10A according to the fourth embodiment provides a function similar to the first embodiment.

Figure 14:
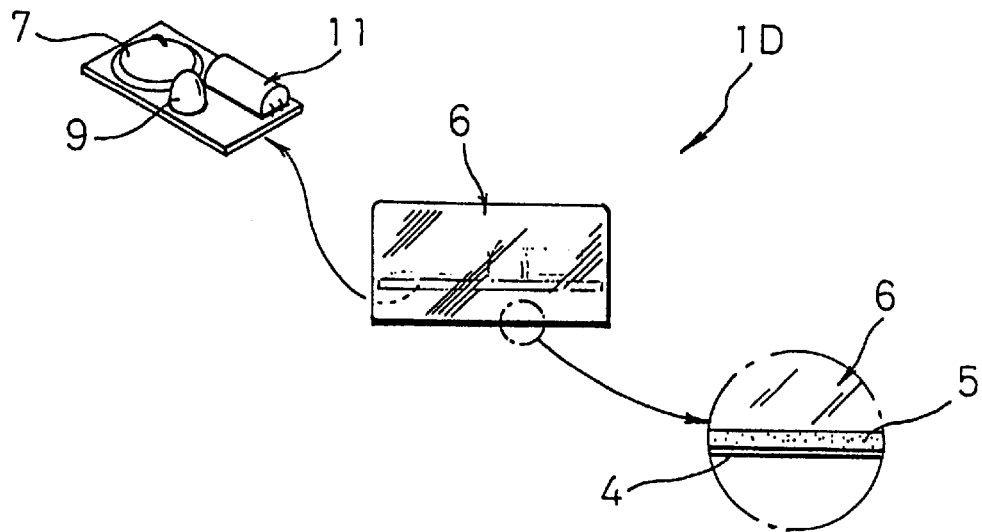
FIG. 14 is a front view showing a fifth embodiment of the present invention.
Figure 15:
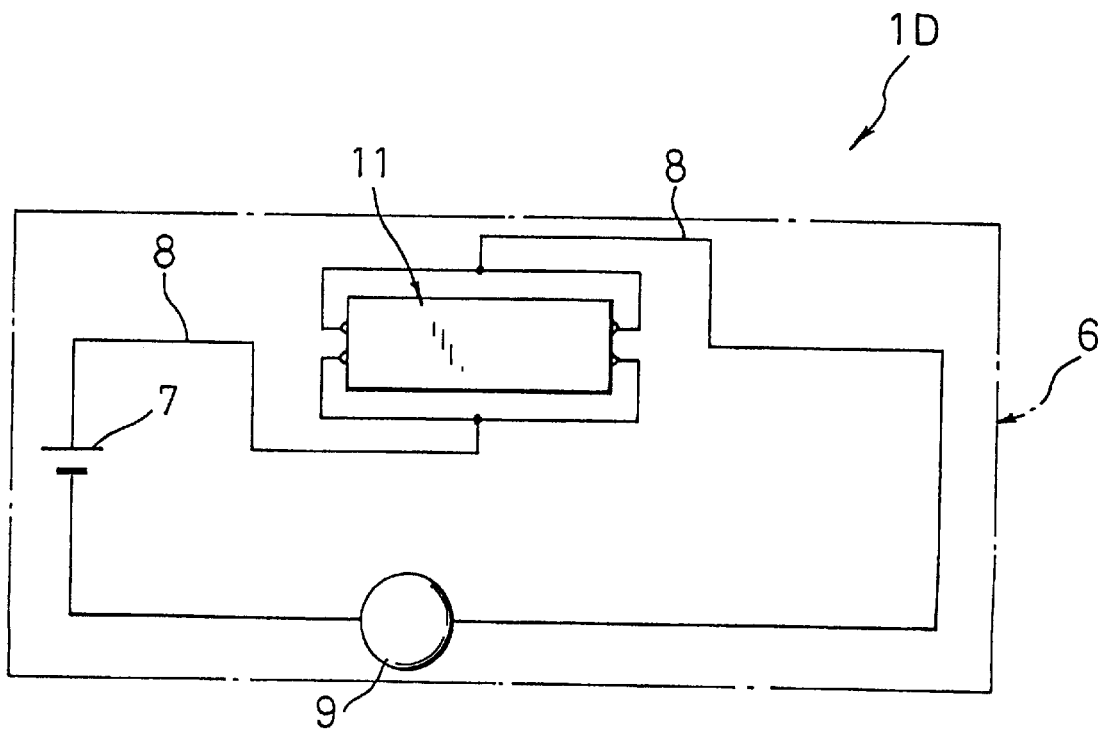
FIG. 15 is a block diagram showing the fifth embodiment of the present invention.
Figure 16:
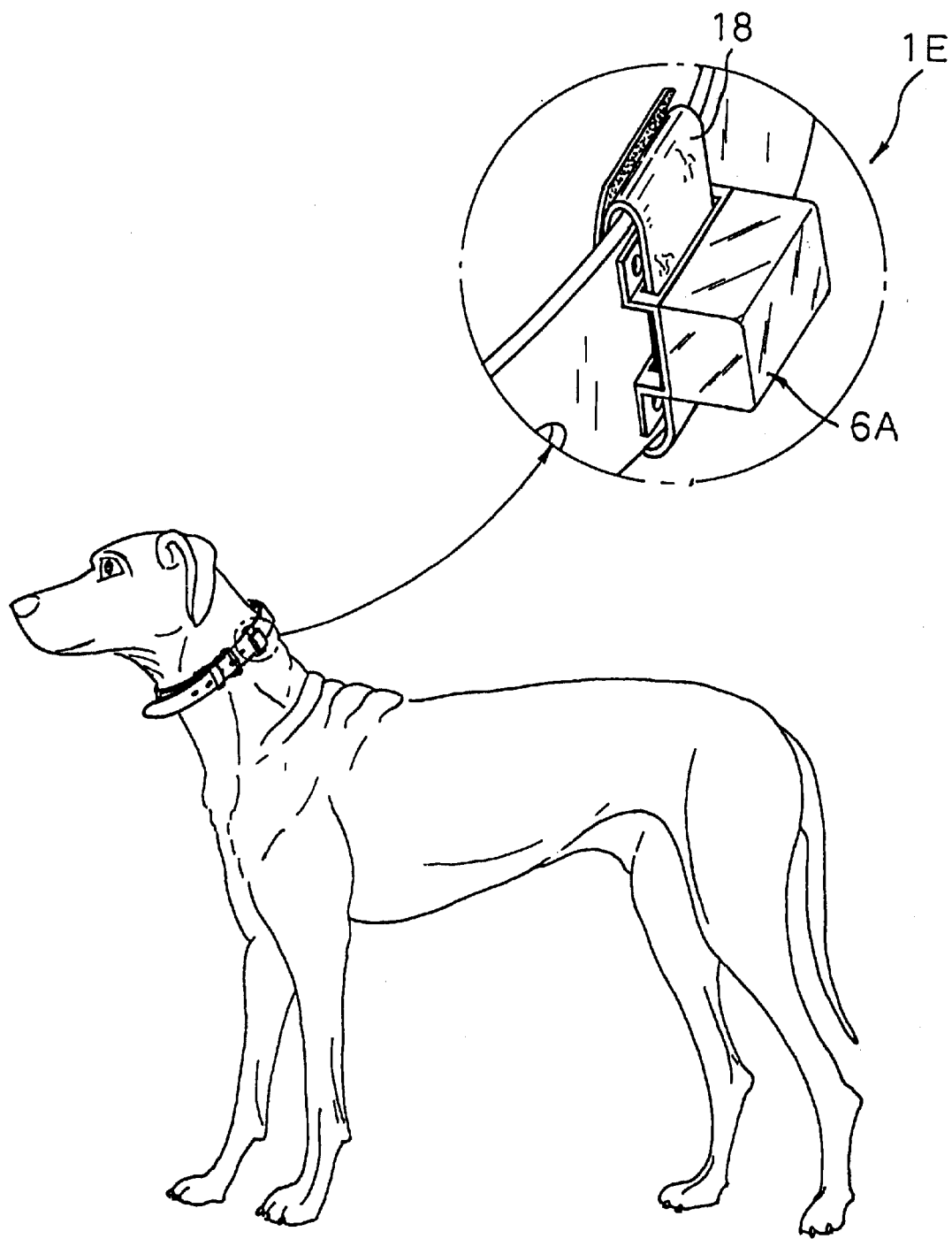
FIG. 16 is an explanatory view in use of an automatic switch showing a sixth embodiment of the present invention.
Figure 17:
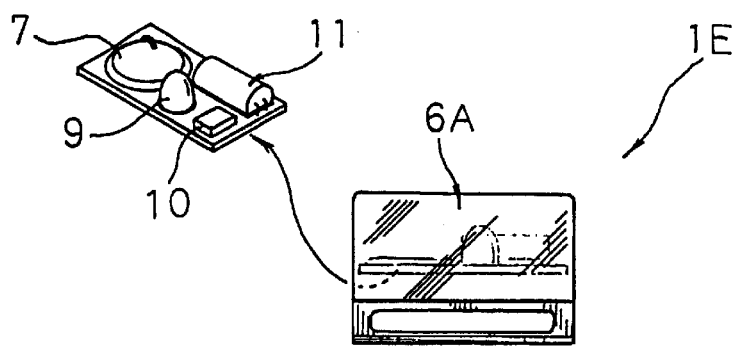
FIG. 17 is a front view showing a sixth embodiment of the present invention.
Figure 18:
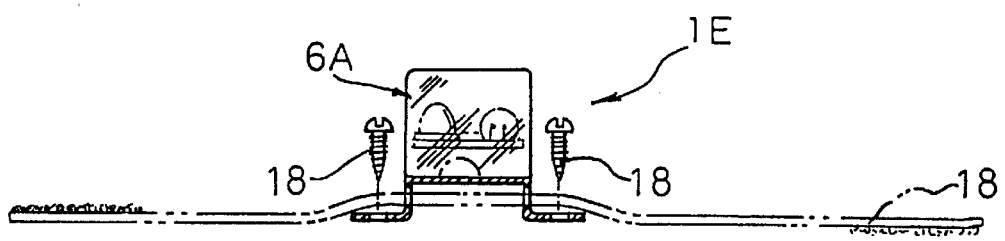
FIG. 18 is a partial cross sectional side view showing the sixth embodiment of the present invention.
Figure 19:
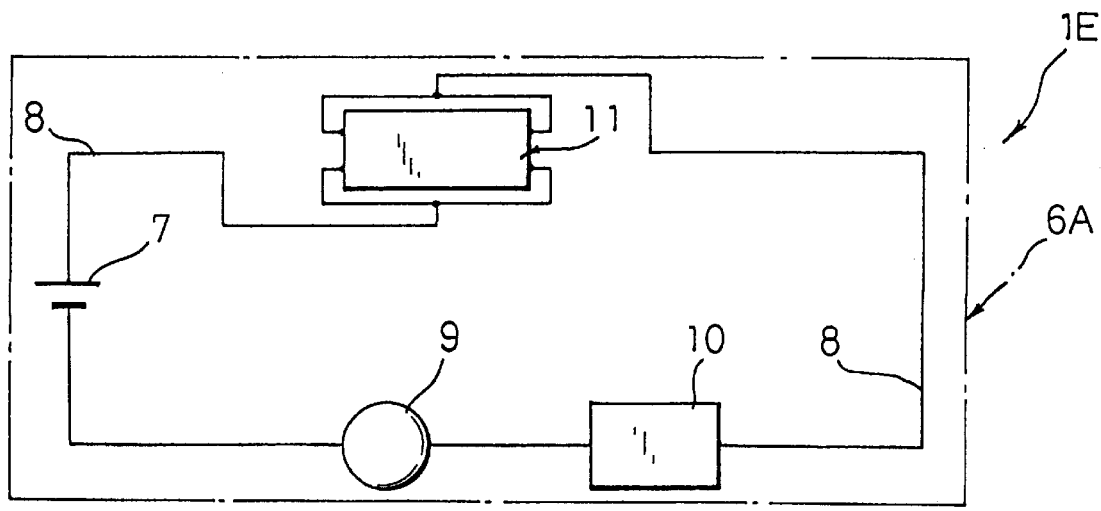
FIG. 19 is a block diagram showing the sixth embodiment of the present invention.

A fifth embodiment of the present invention is shown in FIGS. 14 and 15. It is distinguished from the first embodiment by the fact that just the automatic switch 11 is interposed with the wire 8 that is connected between the battery 7 and the luminous body 9. An indication device ID according to the fifth embodiment provides a function similar to the first embodiment.

A sixth embodiment of the present invention is shown in FIGS. 16 to 19. It is distinguished from the first embodiment by the fact that the case body 6A is provided with fittings such as a bolt, belt 18 or the like and can be attached to a neck of dog, crutch, wheelchair, stick, umbrella, baby carriage or the like via the fittings. An indication device 1E according to the sixth embodiment provides a function similar to the first embodiment.

Figure 20:
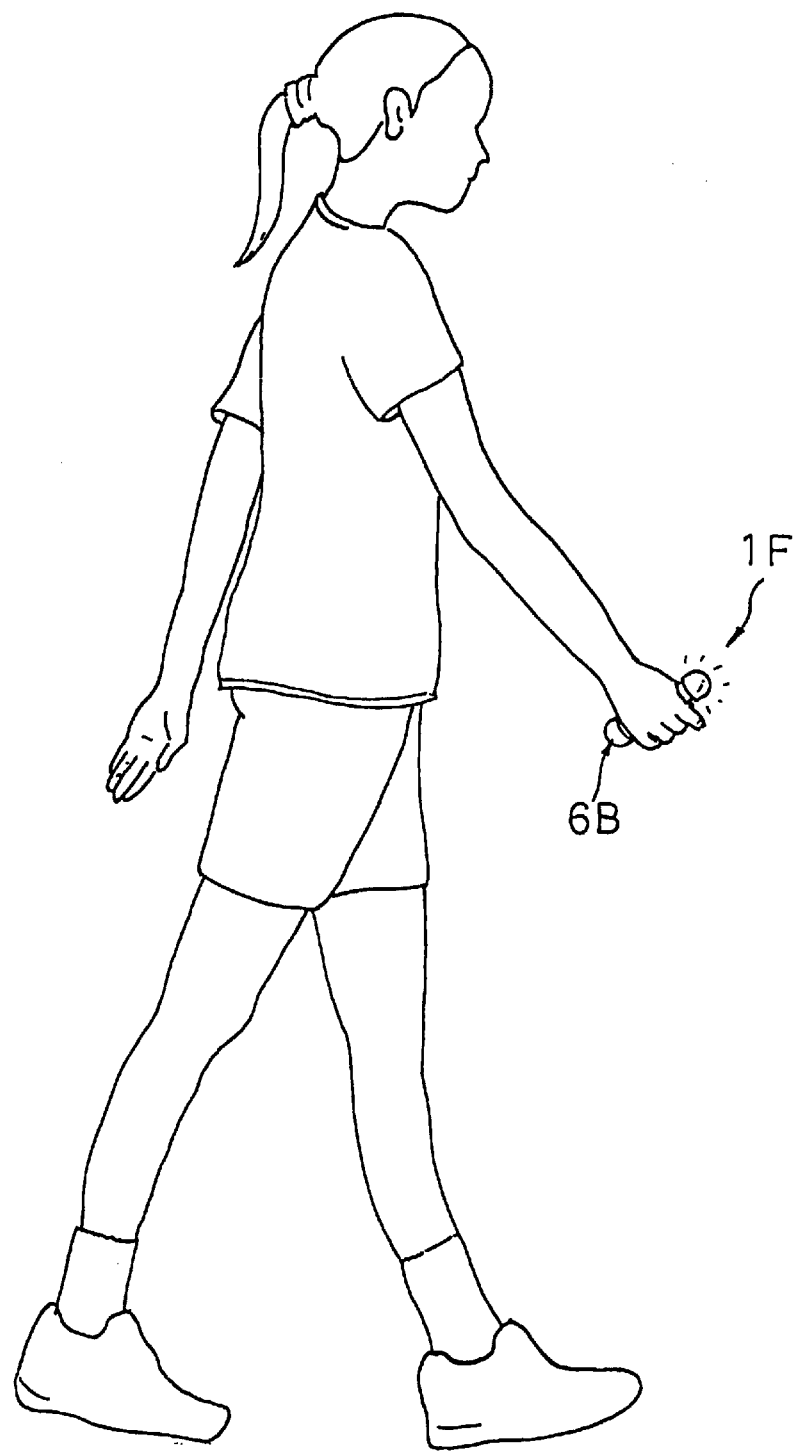
FIG. 20 is an explanatory view in use showing a seventh embodiment of the present invention.
Figure 21:
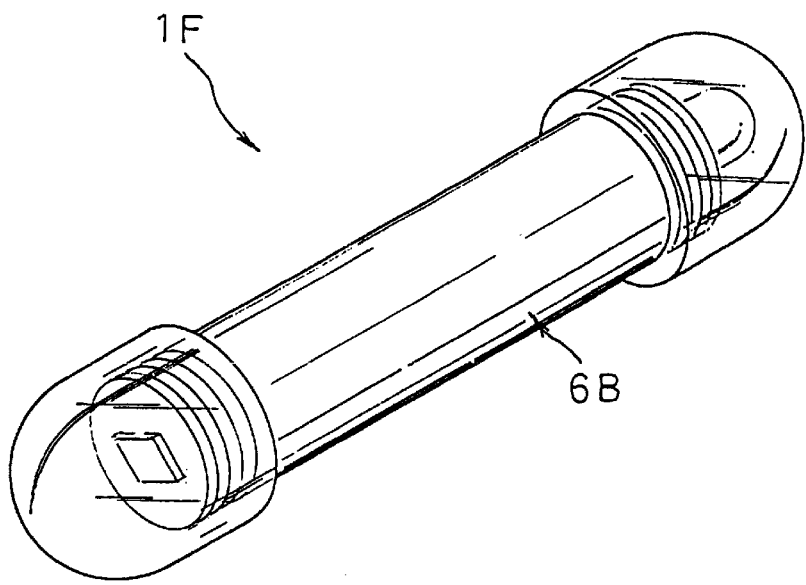
FIG. 21 is a perspective view showing the seventh embodiment of the present invention.
Figure 22:
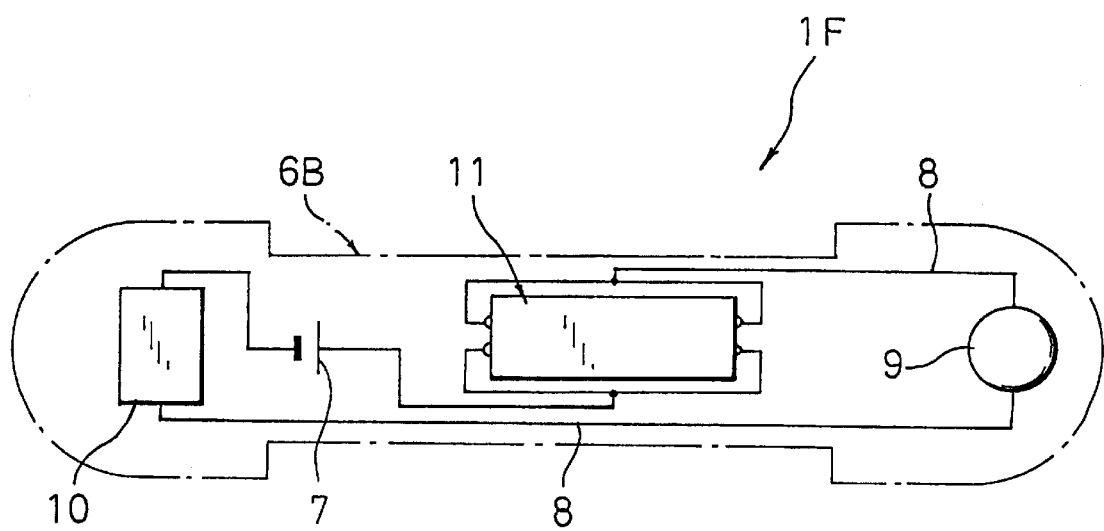
FIG. 22 is a block diagram showing the seventh embodiment of the present invention.

A seventh embodiment of the present invention is shown in FIGS. 20 to 22. It is distinguished from the first embodiment by the fact that the case body 6 is replaced with another case body 6B that can be held by hand. At least one end portion of the case body 6B protrudes in the outward direction when it is held by hand. In this embodiment, both ends protrude in the outward direction. An indication device 1F with such device according to the seventh embodiment provides a function similar to the first embodiment.

Figure 23:
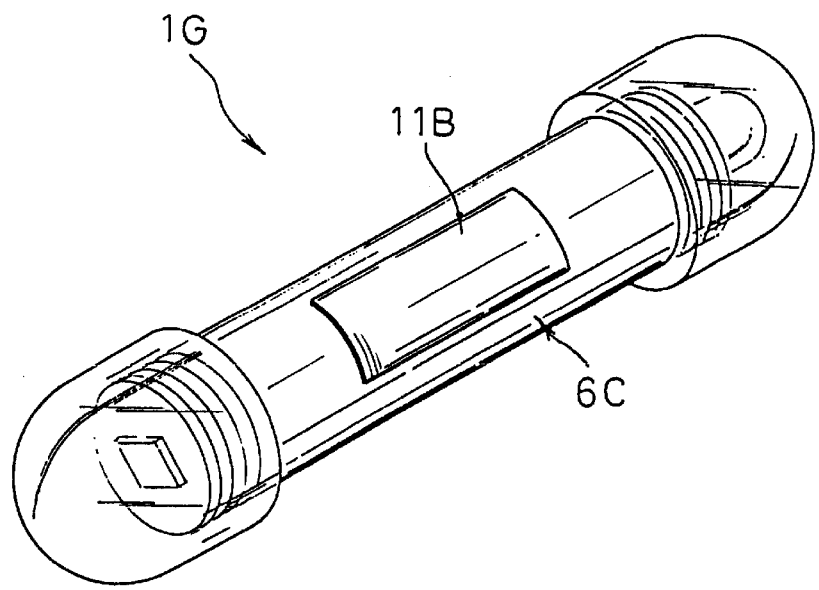
FIG. 23 is a perspective view showing an eighth embodiment of the present invention.
Figure 24:
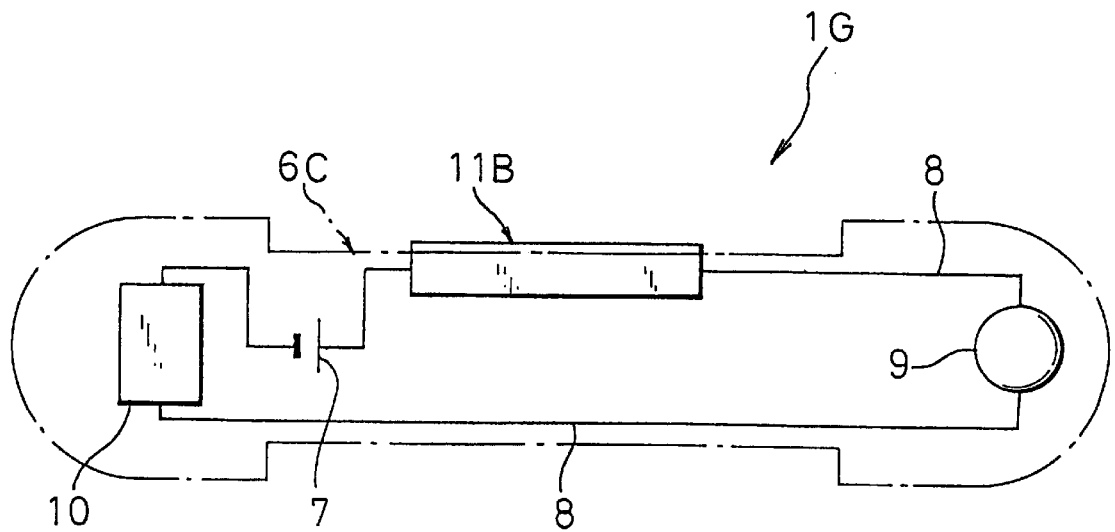
FIG. 24 is a block diagram showing the eighth embodiment of the present invention.

An eighth embodiment of the present invention is shown in FIGS. 23 and 24. It is distinguished from the seventh embodiment by the fact that the automatic switch is replaced with another switch 11B. The switch 11B can be turned on when a user holds a case body 6C by hand. An indication device 1G according to the eighth embodiment provides a function similar to the seventh embodiment.

Figure 25:
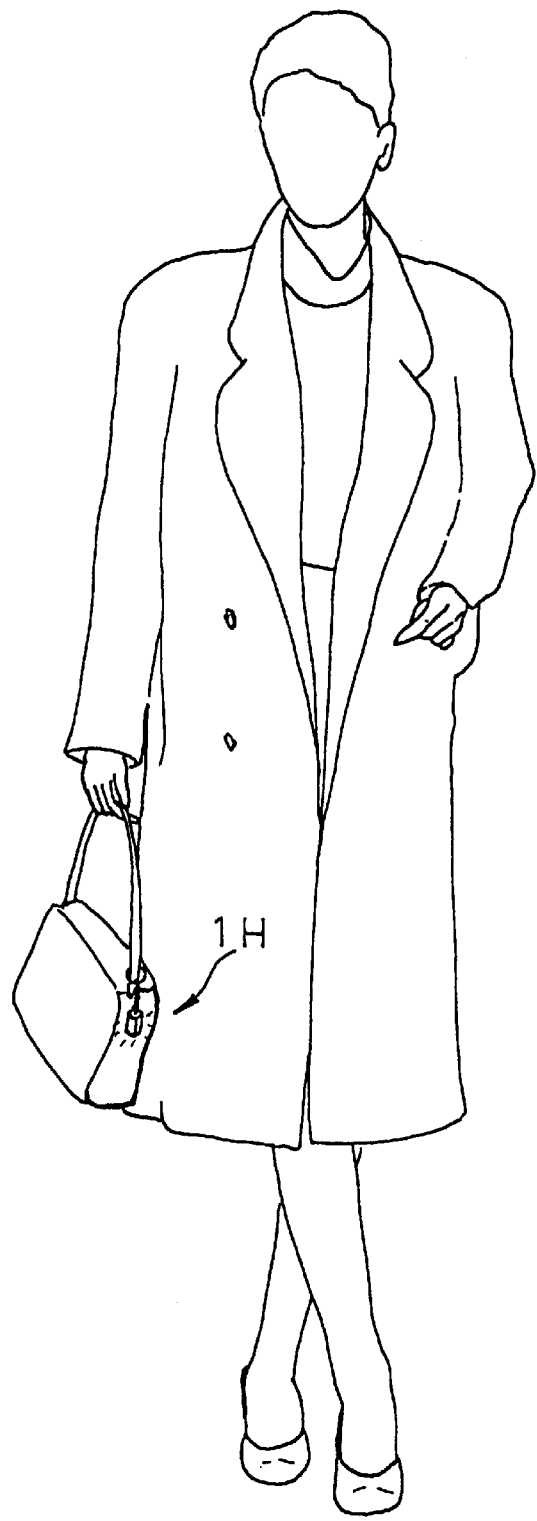
FIG. 25 is an explanatory view in use showing a ninth embodiment of the present invention.
Figure 26:
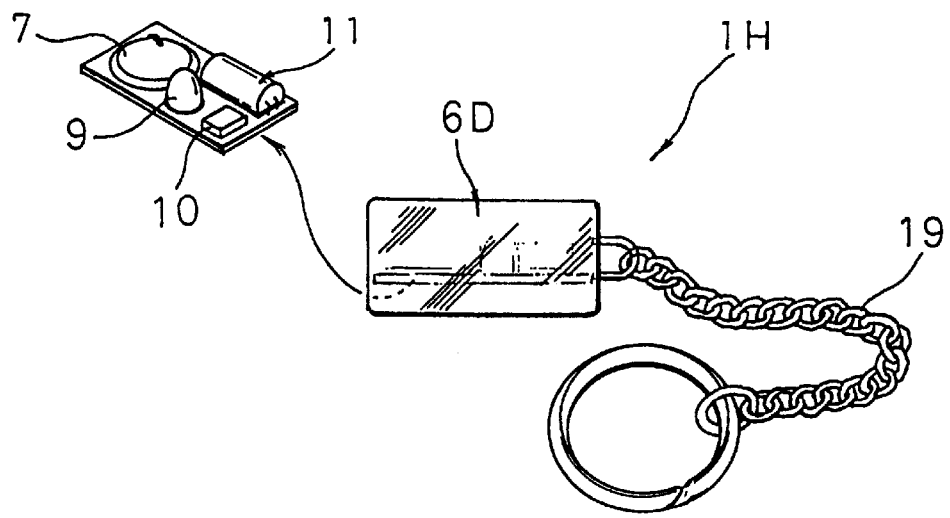
FIG. 26 is a front view showing the ninth embodiment of the present invention.
Figure 27:
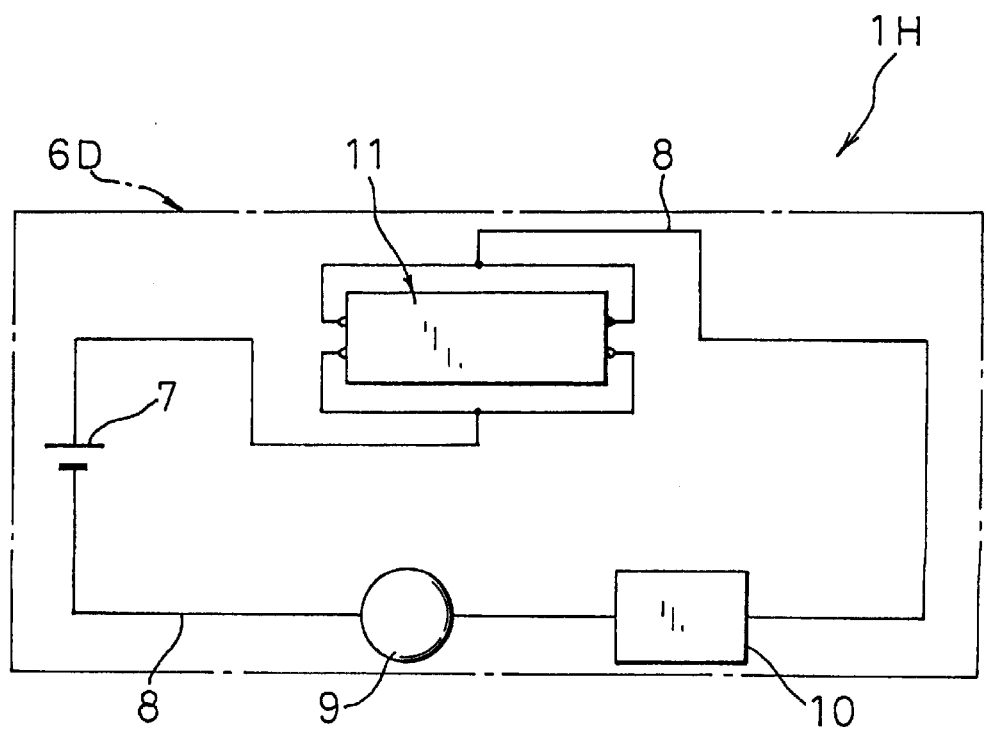
FIG. 27 is a block diagram showing the ninth embodiment of the present invention.
Figure 28:
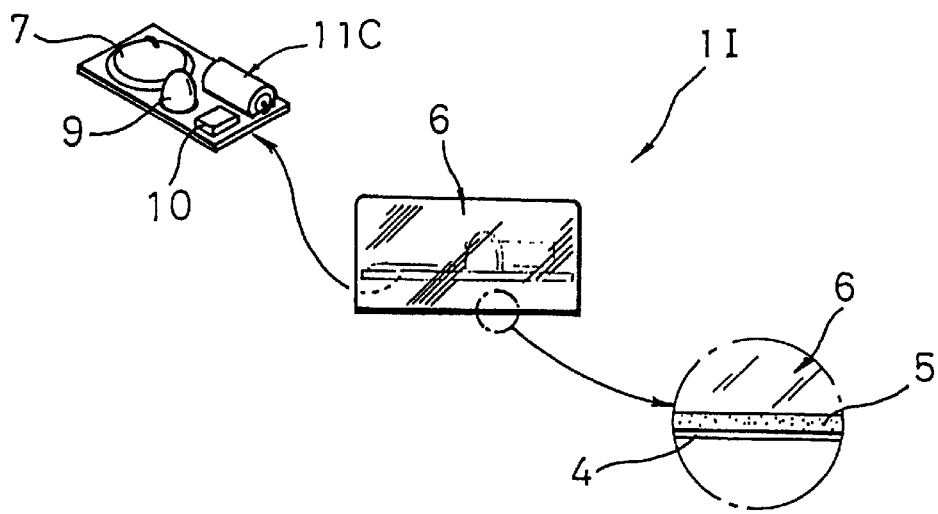
FIG. 28 is a front view showing a tenth embodiment of the present invention.
Figure 29:
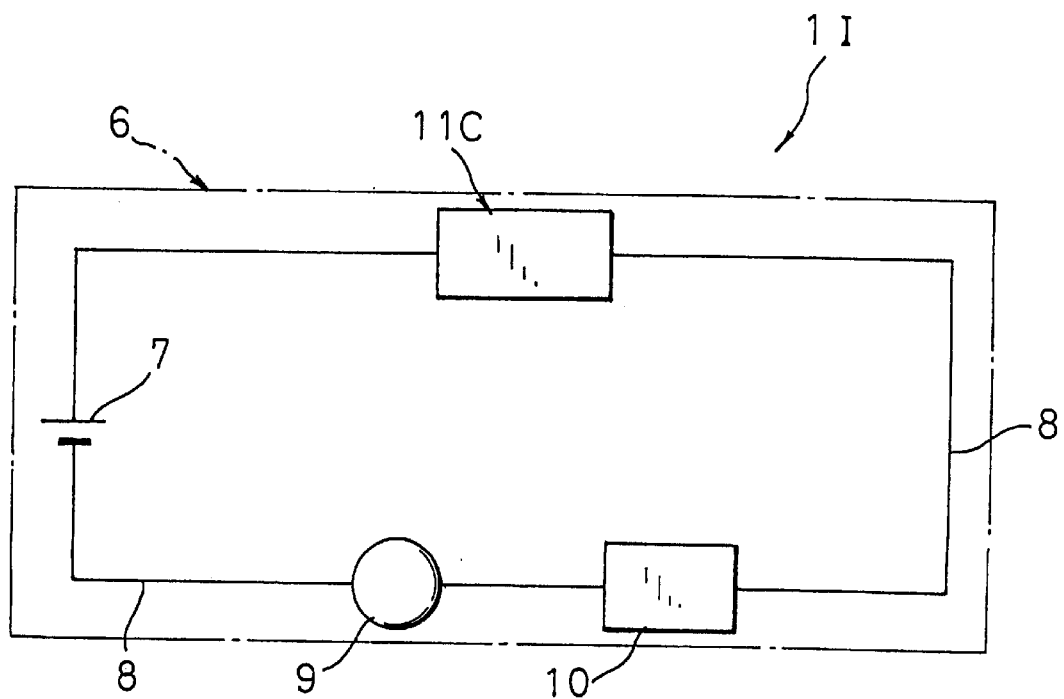
FIG. 29 is a block diagram showing the tenth embodiment of the present invention.
Figure 30:
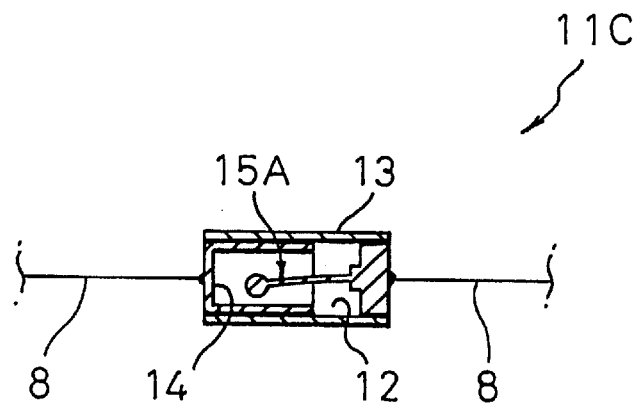
FIG. 30 is an explanatory view of an automatic switch showing the tenth embodiment of the present invention.
Figure 31:
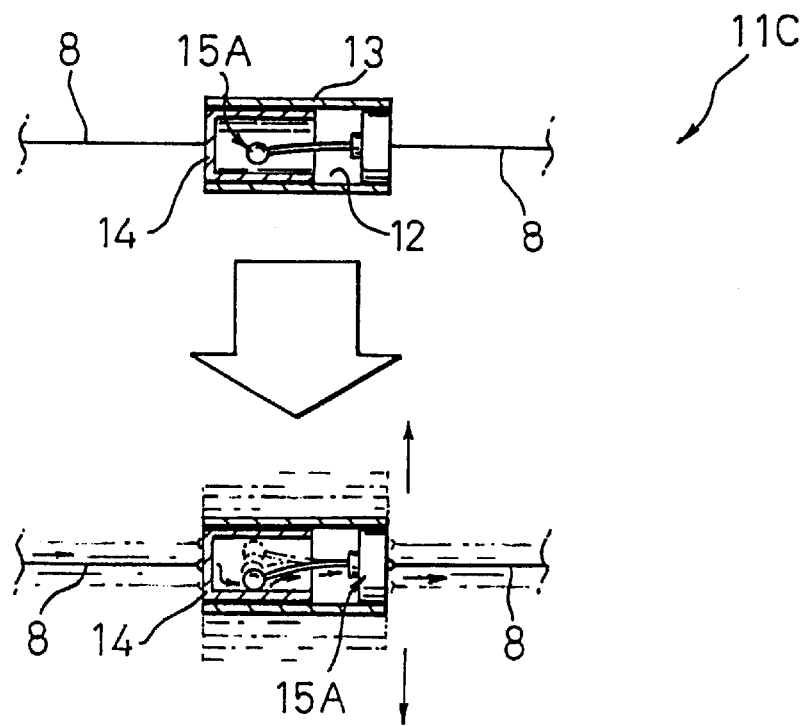
FIG. 31 is an explanatory view in operation of the automatic switch showing the tenth embodiment of the present invention.

A ninth embodiment of the present invention is shown in FIGS. 25 to 27. It is distinguished from the first embodiment by the fact that the case body 6 is replaced with another case body 6D having a suspending member 19 such as a keyholder at a suspending manner such that the suspending member 19 can be used to suspend from a bag, brief case or the like. An indication device 1H according to the ninth embodiment provides a function similar to the first embodiment.

A tenth embodiment of the present invention is shown in FIGS. 28 to 31. It is distinguished from the first embodiment by the fact that the automatic switch 11 is replaced with another switch 11C having a movable contact 15A. Movable contact 15A is formed such that the stick of the movable contact 15A swings by oscillation and a top portion of the stick contacts with the fixed contact 14 by a weight of the top portion thereof. An indication device 1I according to the tenth embodiment provides a function similar to the first embodiment.

Figure 32:
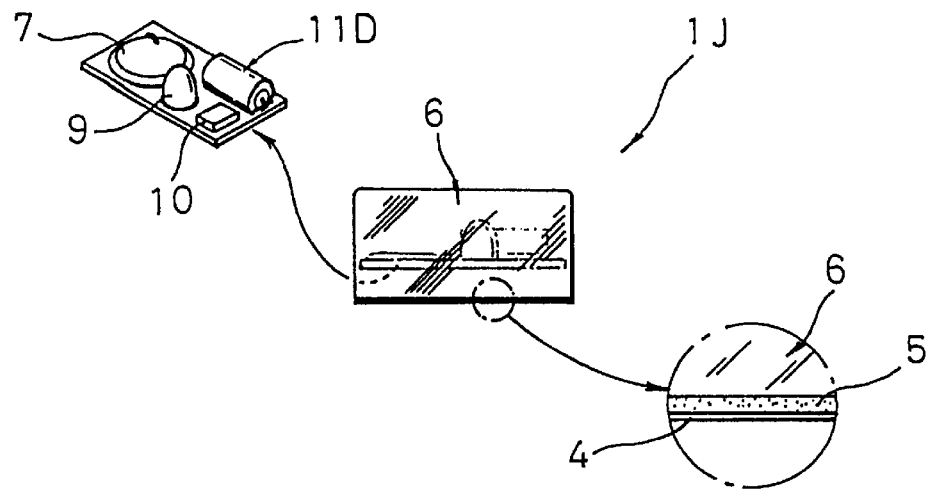
FIG. 32 is a front view showing an eleventh embodiment of the present invention.
Figure 33:
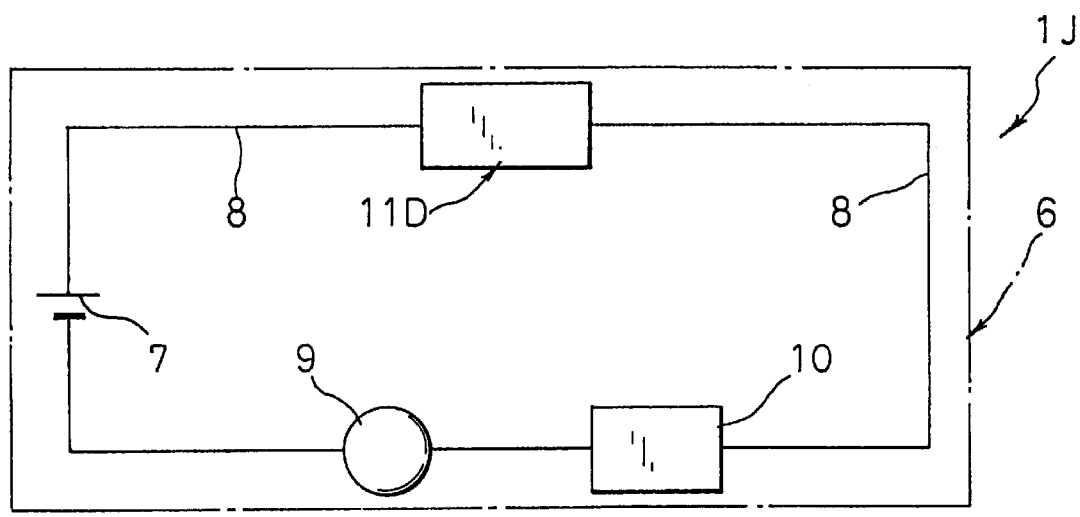
FIG. 33 is a block diagram showing the eleventh embodiment of the present invention.
Figure 34:
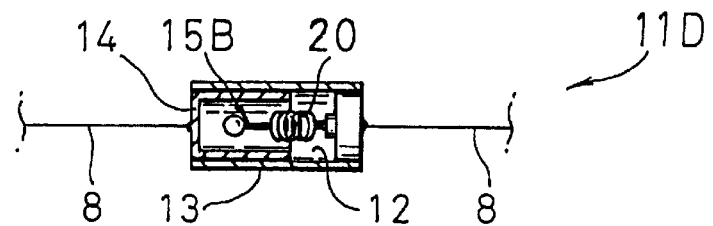
FIG. 34 is an explanatory view of an automatic switch showing the eleventh embodiment of the present invention.

An eleventh embodiment of the present invention is shown in FIGS. 32 to 34. It is distinguished from the tenth embodiment by the fact that the automatic switch 11C is replaced with another switch 11D having a movable contact 15B. A stick portion of the movable contact 15B is provided with a spring 20 in the middle thereof. An indication device 1J according to the eleventh embodiment provides a function similar to the tenth embodiment.

Figure 35:
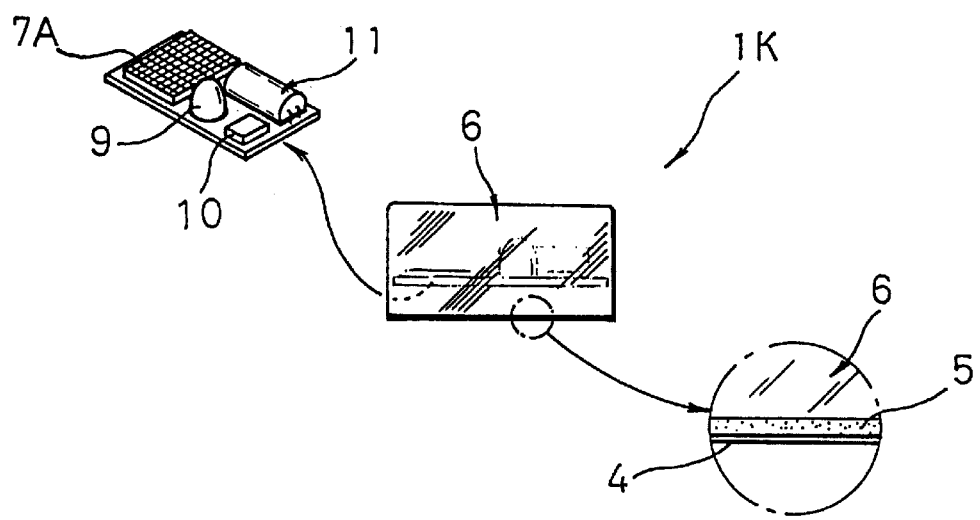
FIG. 35 is an explanatory view showing a twelfth embodiment of the present invention.
Figure 36:
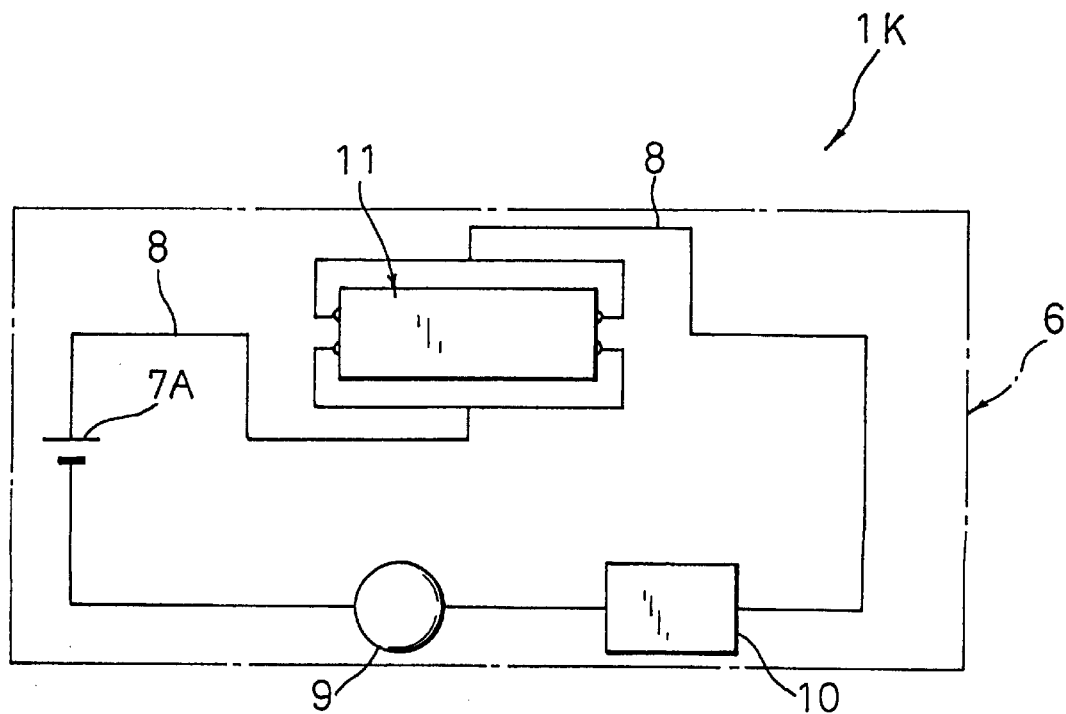
FIG. 36 is a block diagram showing the twelfth embodiment of the present invention.

A twelfth embodiment of the present invention is shown in FIGS. 35 and 36. It is distinguished from the first embodiment by the fact that the battery 7 is replaced with another battery 7A that is a solar battery. An indication device 1K with such device according to the twelfth embodiment provides a function similar to the first embodiment.

Figure 37:
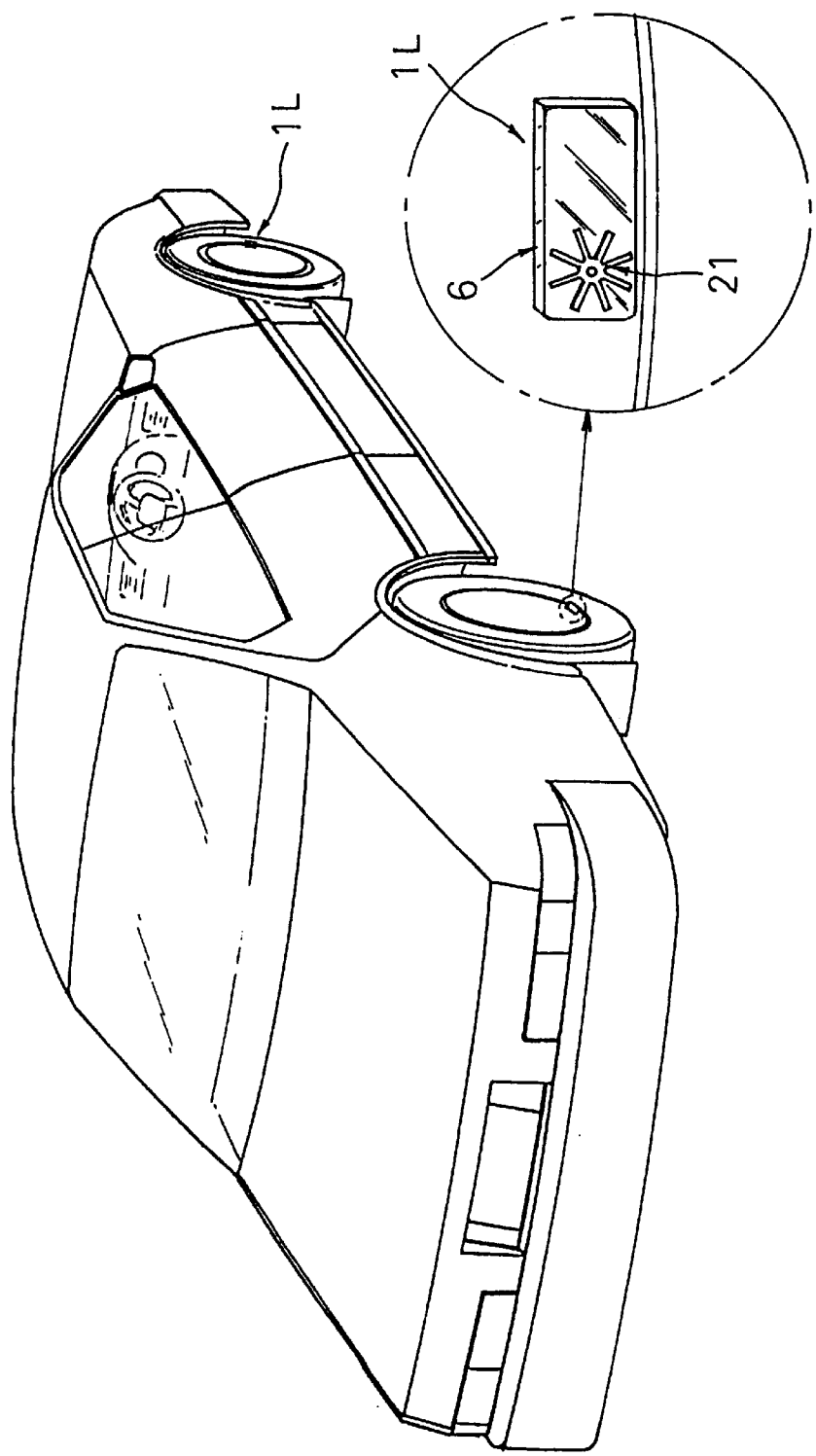
FIG. 37 is an explanatory view in use showing a thirteenth embodiment of the present invention.
Figure 38:
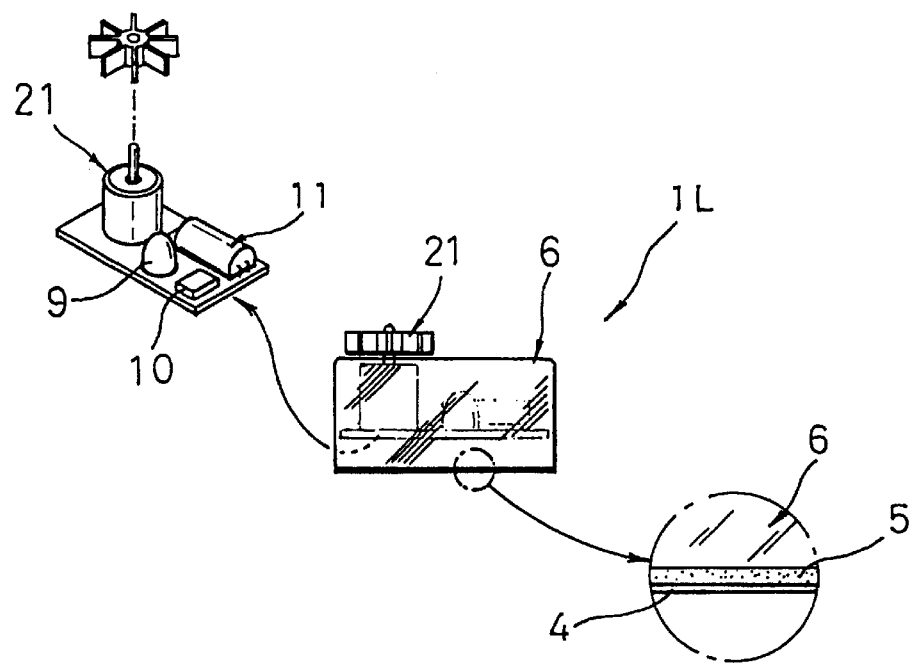
FIG. 38 is an explanatory view showing the thirteenth embodiment of the present invention.
Figure 39:
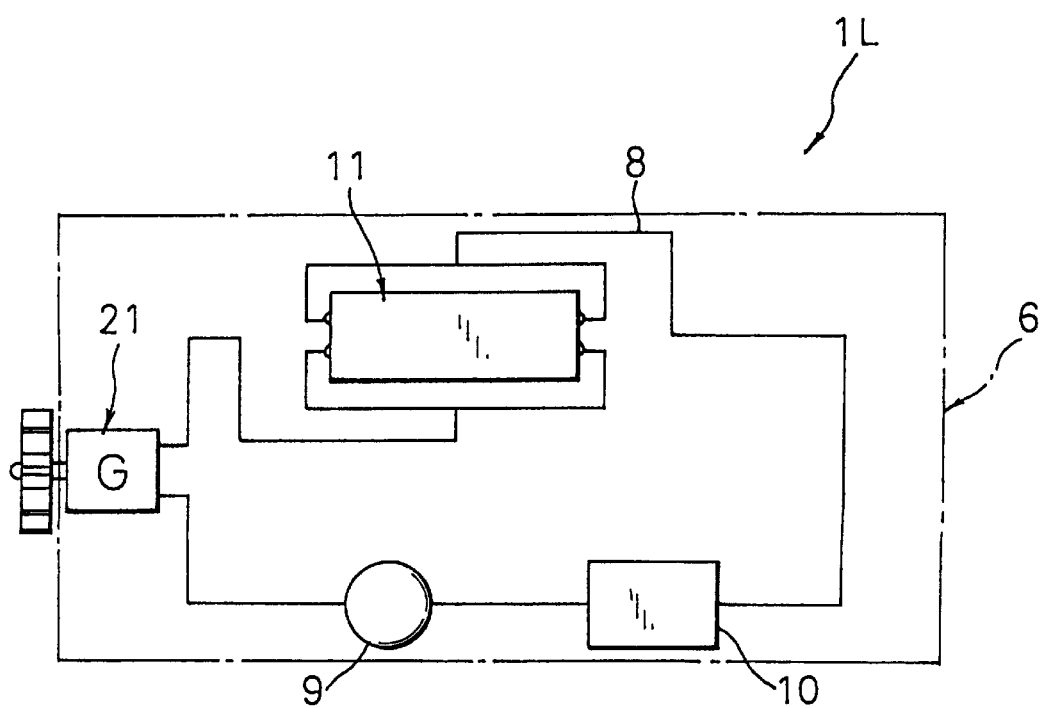
FIG. 39 is a block diagram showing the thirteenth embodiment of the present invention.

A thirteenth embodiment of the present invention is shown in FIGS. 37 to 39. It is distinguished from the first embodiment by the fact that a wind-force generator 21 is used instead of the ordinary battery. An indication device 1L with such device according to the thirteenth embodiment provides a function similar to the first embodiment.

Figure 40:
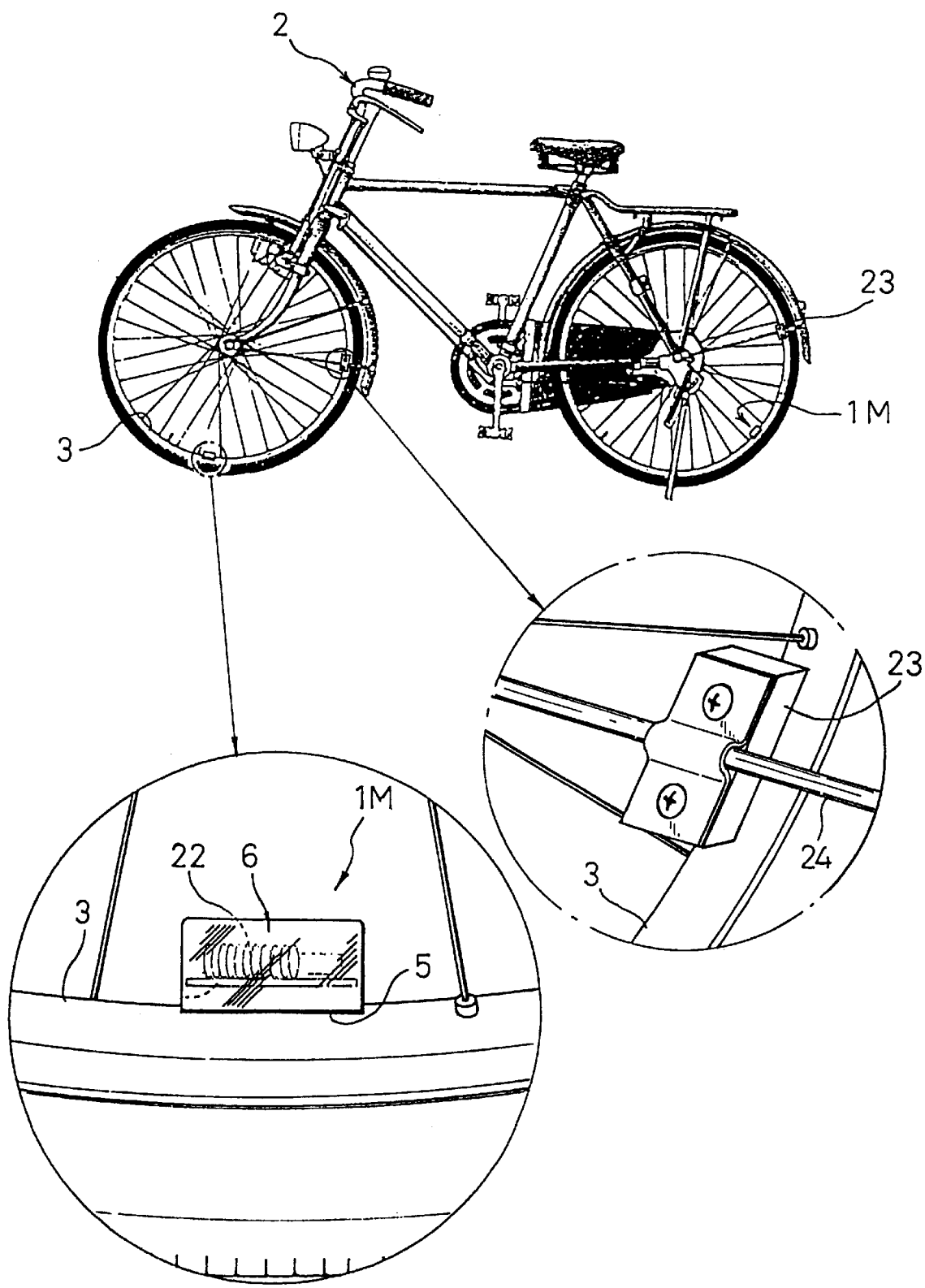
FIG. 40 is an explanatory view in use showing a fourteenth embodiment of the present invention.
Figure 41:
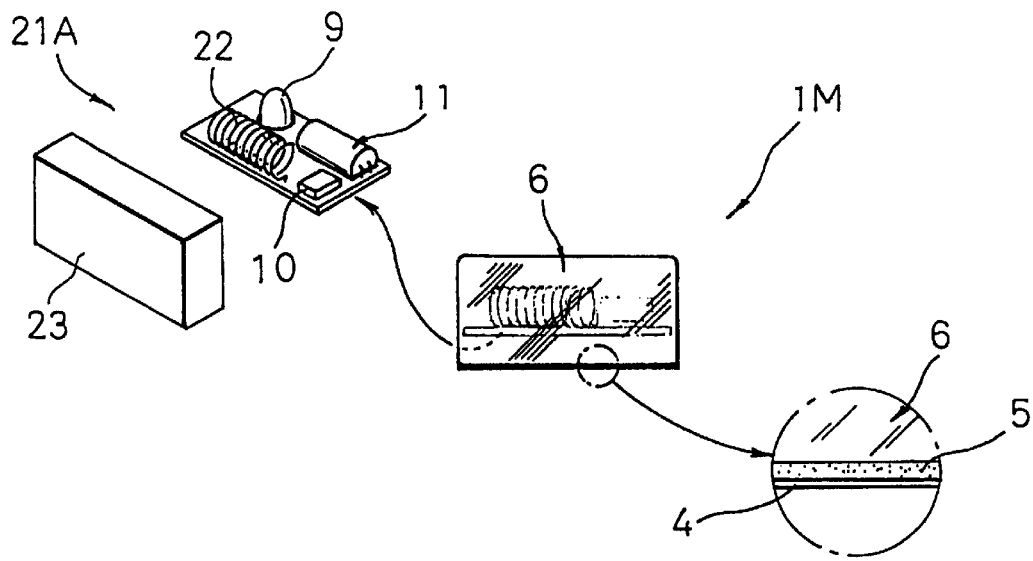
FIG. 41 is an explanatory view showing the fourteenth embodiment of the present invention.
Figure 42:
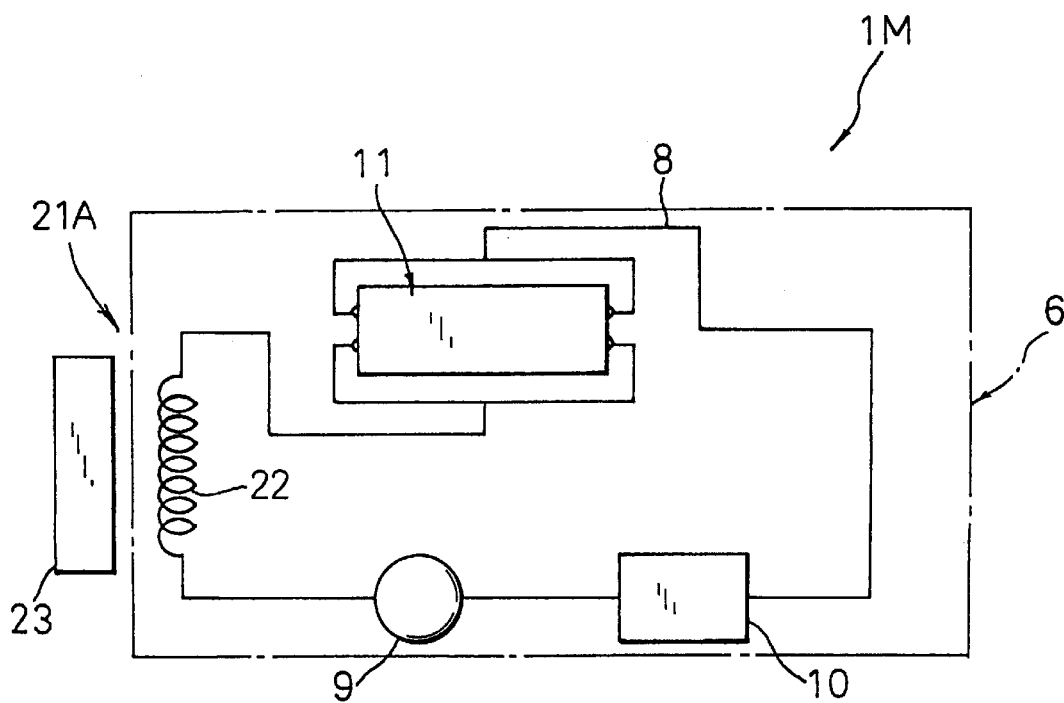
FIG. 42 is a block diagram showing the fourteenth embodiment of the present invention.

A fourteenth embodiment of the present invention is shown in FIGS. 40 to 42. It is distinguished from the first embodiment by the fact that the case body 6 is provided to the wheel 3 of the bicycle 2, the case body 6 having a coil 22 for generation. Further, a generator 21A has at least a magnet 23 for generation provided with spokes 24 as a fixed portion corresponding to a rotating portion attached the case body 6. An indication device 1M with such device according to the fourteenth embodiment provides a function similar to the first embodiment.

Figure 43:
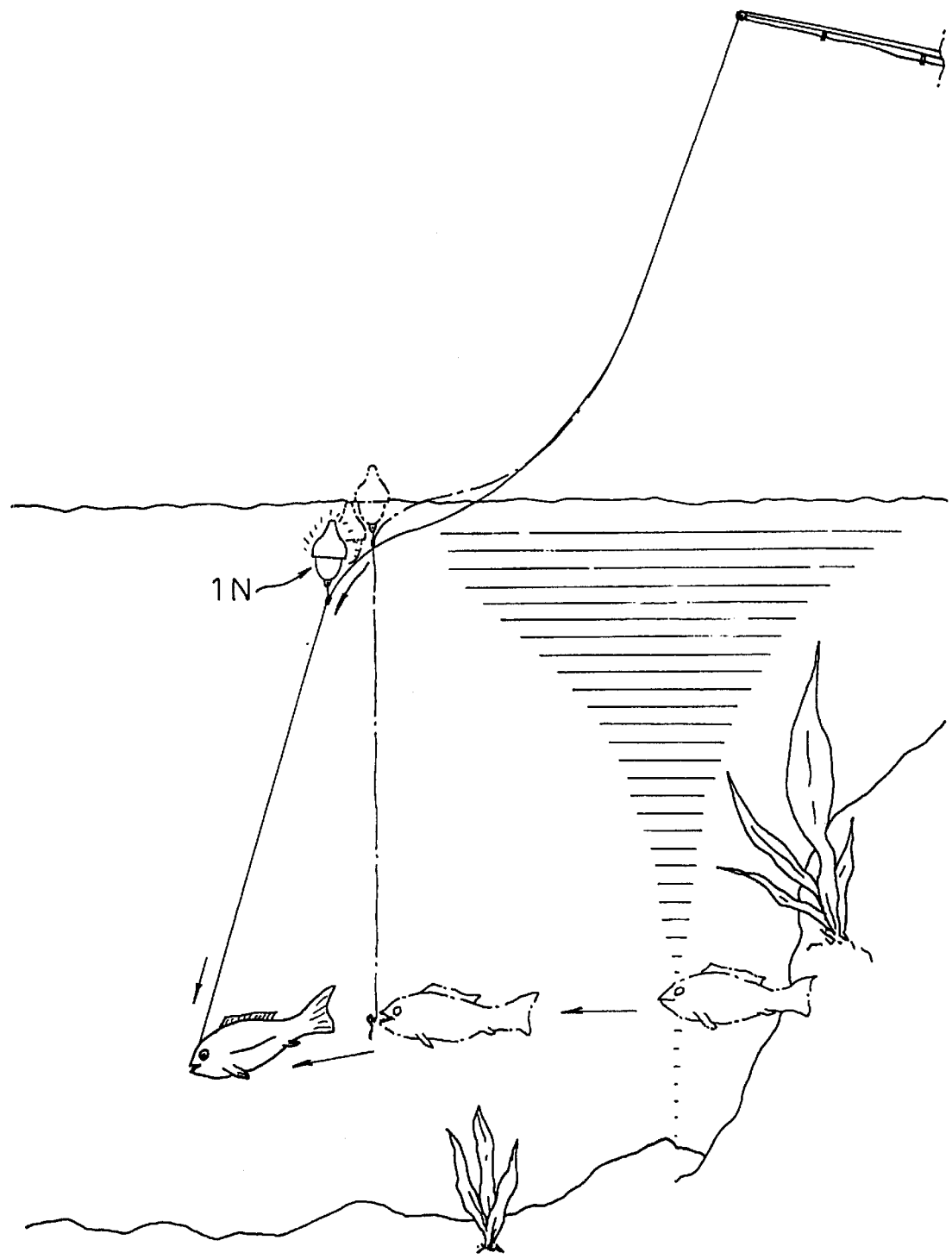
FIG. 43 is an explanatory view in use showing the fifteenth embodiment of the present invention.
Figure 44:
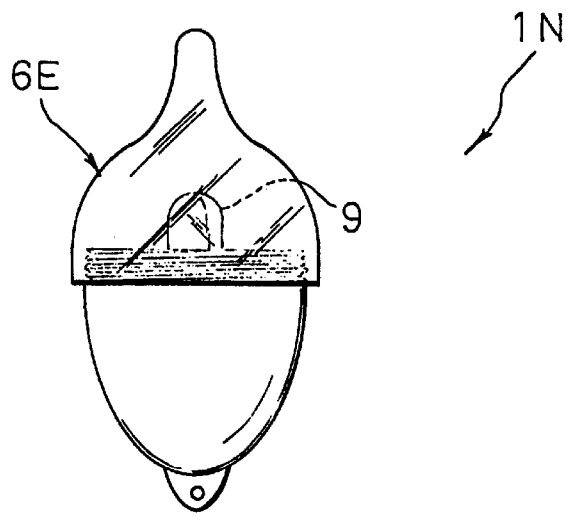
FIG. 44 is an explanatory view showing the fifteenth embodiment of the present invention.
Figure 45:
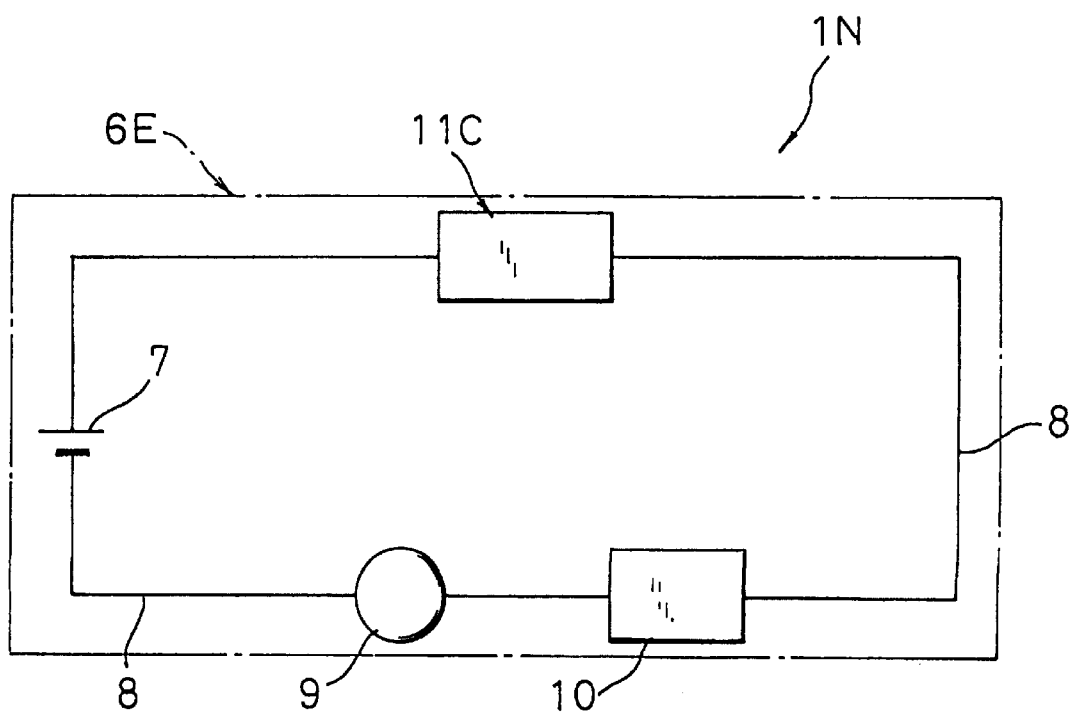
FIG. 45 is a block diagram showing the fifteenth embodiment of the present invention.

A fifteenth embodiment of the present invention is shown in FIGS. 43 to 45. It is distinguished from the tenth embodiment by the fact that the case body 6 is replaced with the case body 6E that is formed in a shape being capable of floating for fishing. The case body 6E is pulled when at least one fish is hooked, at the same time; the luminous body of the case body 6E emits light. Therefore, an indication device 1N with such device according to the fifteenth embodiment provides a function similar to the tenth embodiment.

Figure 46:
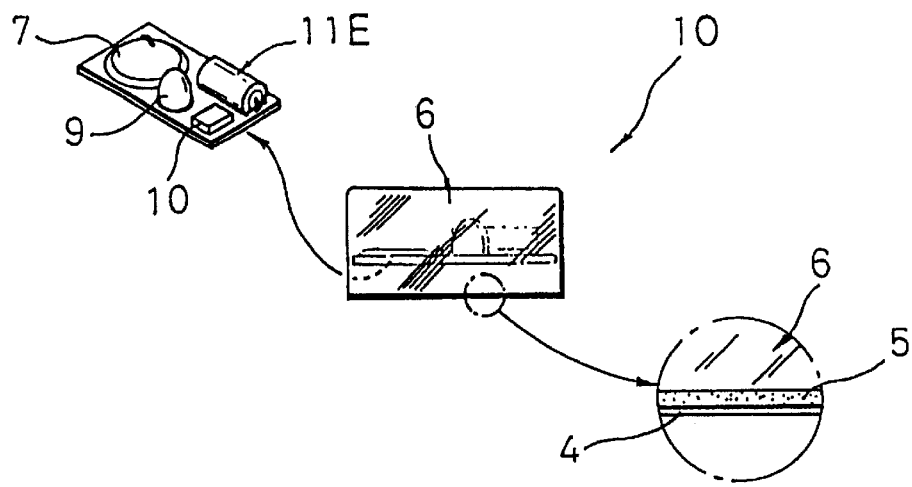
FIG. 46 is an explanatory view showing a sixteenth embodiment of the present invention.
Figure 47:
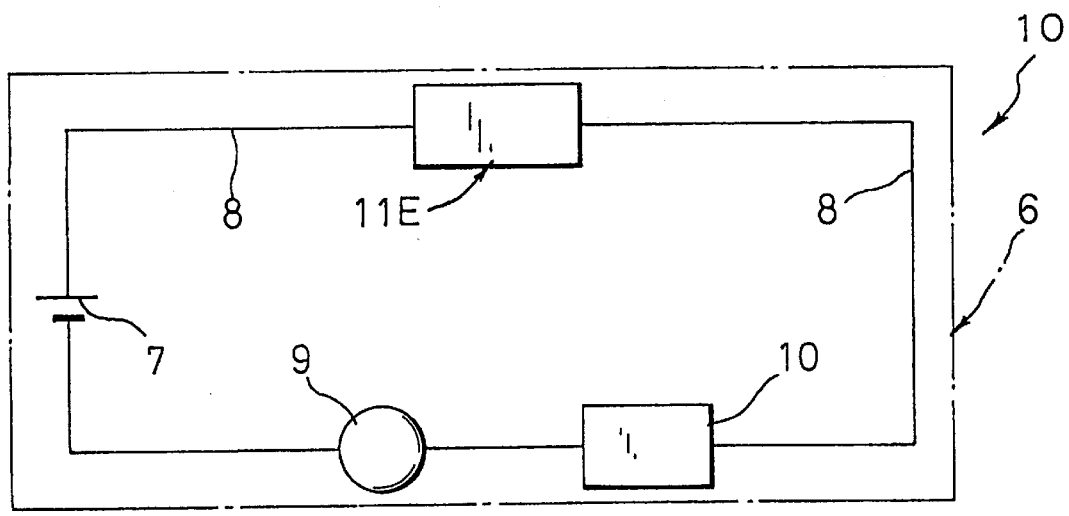
FIG. 47 is a block diagram showing the sixteenth embodiment of the present invention.
Figure 48:
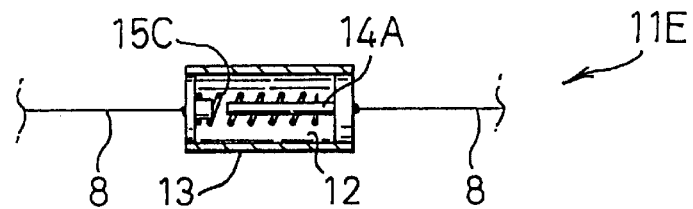
FIG. 48 is an explanatory view of an automatic switch showing the sixteenth embodiment of the present invention.

A sixteenth embodiment of the present invention is shown in FIGS. 46 to 48. It is distinguished from the tenth embodiment by the fact that the fixed contact 14 is replaced with another fixed contact 14A formed in the shape of a stick. The automatic switch 11C is replaced with another switch 11E having a movable contact 15C formed in the shape of a spring and provided around the fixed contact 14A.

The movable contact 15C is not contacting the outer circumferential portion of the fixed contact 14A when it is stationary and contacts the outer circumferential portion thereof when it is in motion. An indication device 1O with such device according to the sixteenth embodiment provides a function similar to the tenth embodiment.

Figure 49:
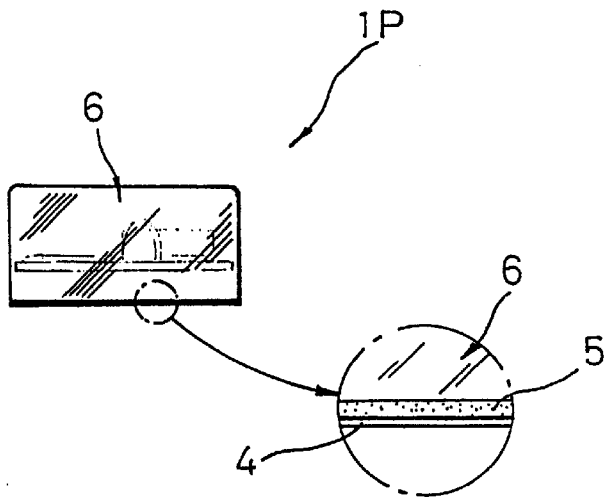
FIG. 49 is an explanatory view showing a seventeenth embodiment of the present invention.
Figure 50:
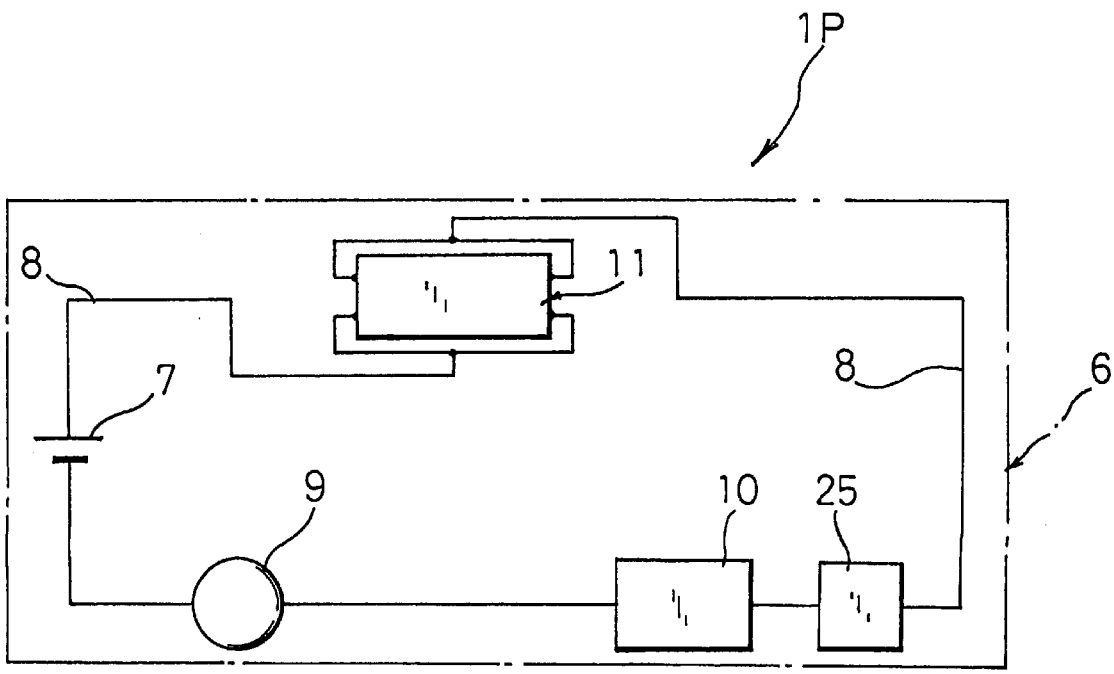
FIG. 50 is a block diagram showing the seventeenth embodiment of the present invention.

A seventeenth embodiment of the present invention is shown in FIGS. 49 and 50. It is distinguished from the first embodiment by the fact that a flow rating circuit 25 is interposed between the ON/OFF switch 10 and automatic switch 11. An indication device 1P with such circuit 25 according to the seventeenth embodiment provides a function similar to the first embodiment and it allows the luminous body 9 to light at a stable state.

Figure 51:
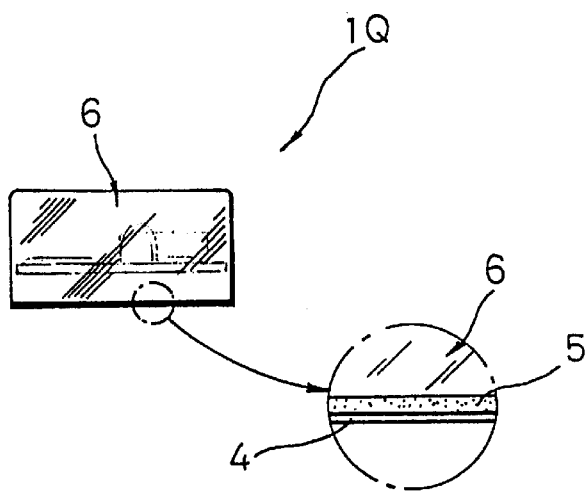
FIG. 51 is a front view showing an eighteenth embodiment of the present invention.
Figure 52:
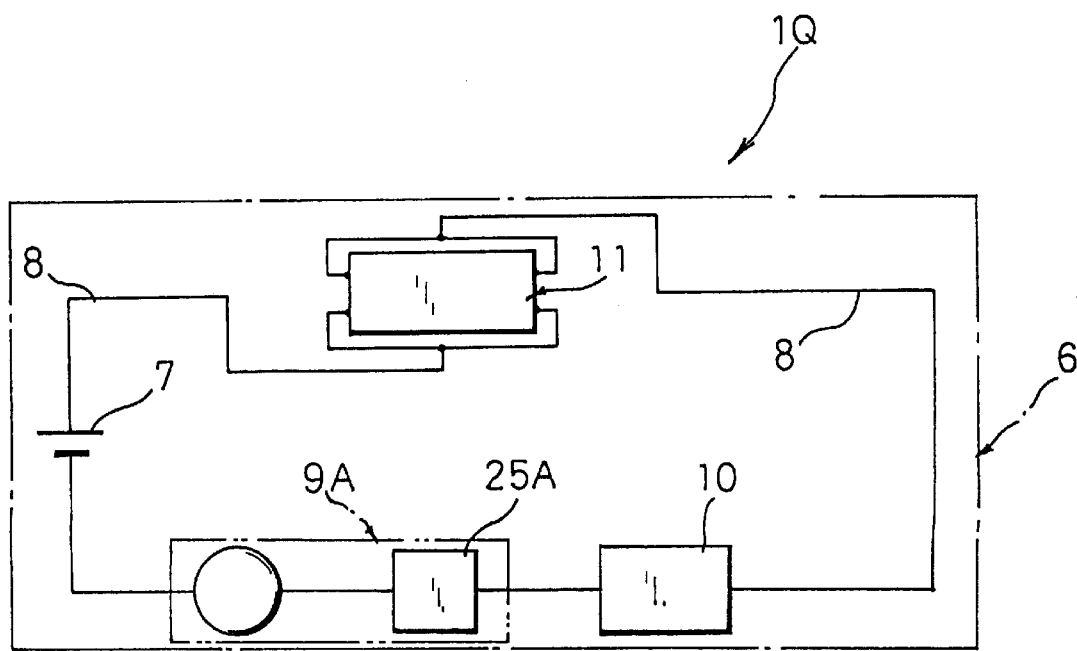
FIG. 52 is a block diagram showing the eighteenth embodiment of the present invention.

An eighteenth embodiment of the present invention is shown in FIGS. 51 and 52. It is distinguished with the first embodiment by the fact that the luminous body 9 is replaced from another luminous body 9A having a flow rating circuit 25A. An indication device 1Q according to the eighteenth embodiment provides a function similar to the first embodiment.

Figure 53:
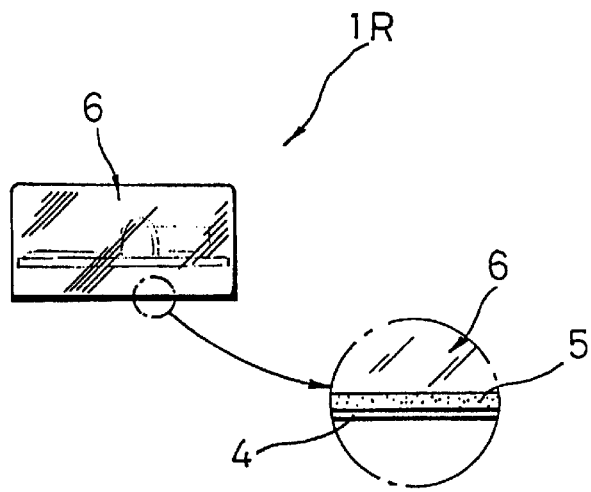
FIG. 53 is a front view showing a nineteenth embodiment of the present invention.
Figure 54:
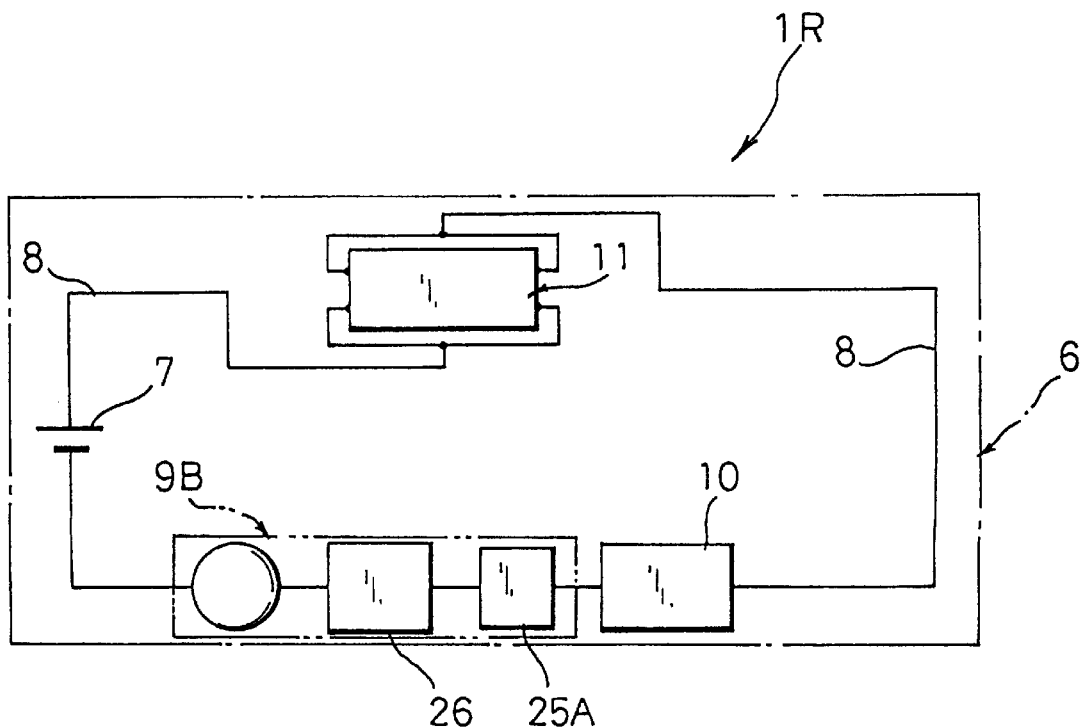
FIG. 54 is a block diagram showing the nineteenth embodiment of the present invention.

A nineteenth embodiment of the present invention is shown in FIGS. 53 and 54. It is distinguished from the eighteenth embodiment by the fact that the luminous body 9A is replaced with the luminous body 9B having an intermittent circuit 26. An indication device 1R according to the nineteenth embodiment provides a function similar to the eighteenth embodiment.

Figure 55:
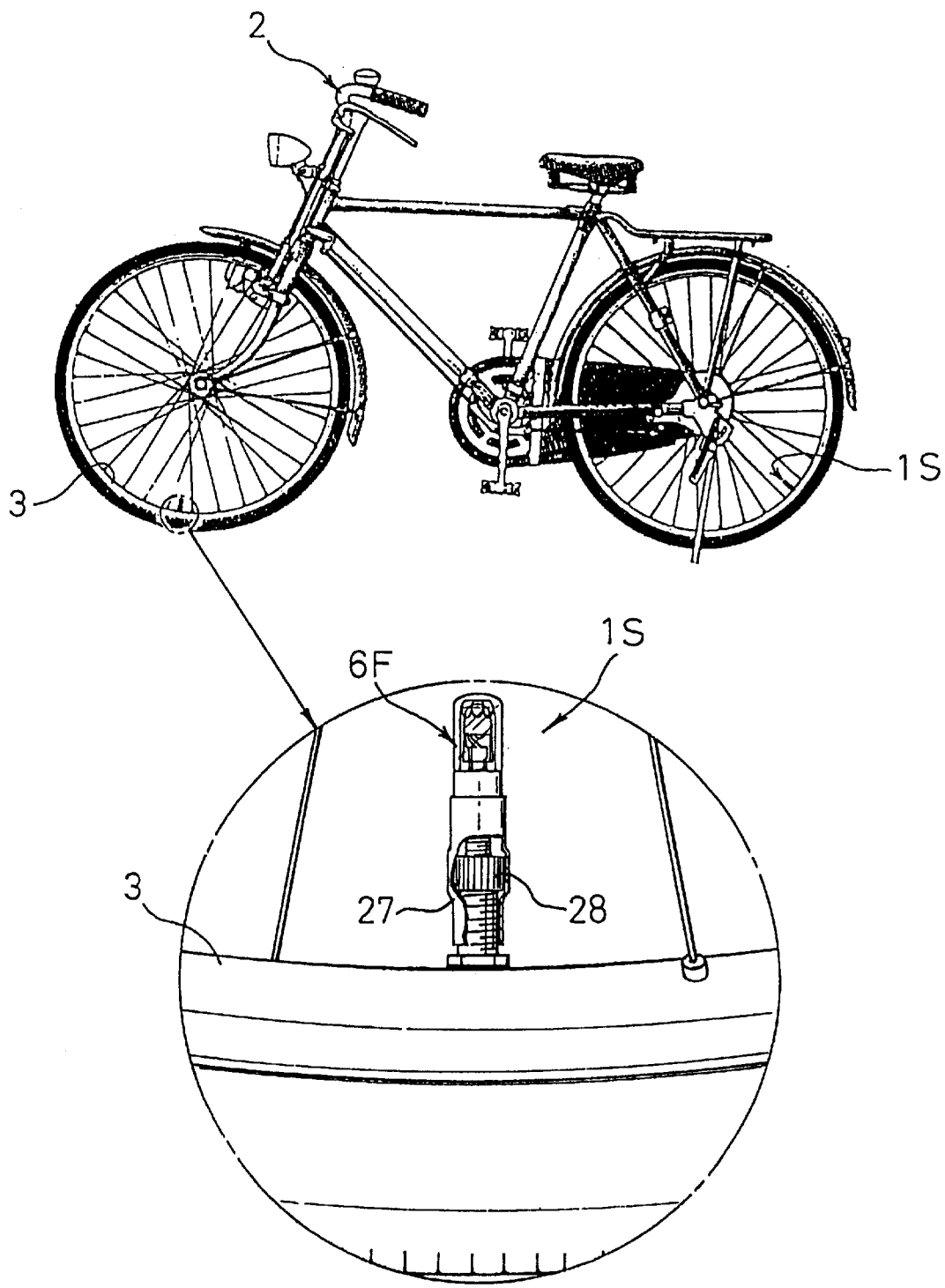
FIG. 55 is an explanatory view in use showing a twentieth embodiment of the present invention.
Figure 56:
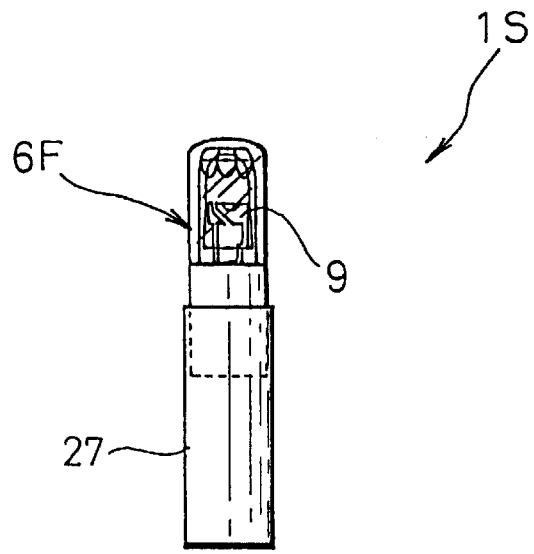
FIG. 56 is a front view showing the twentieth embodiment of the present invention.
Figure 57:
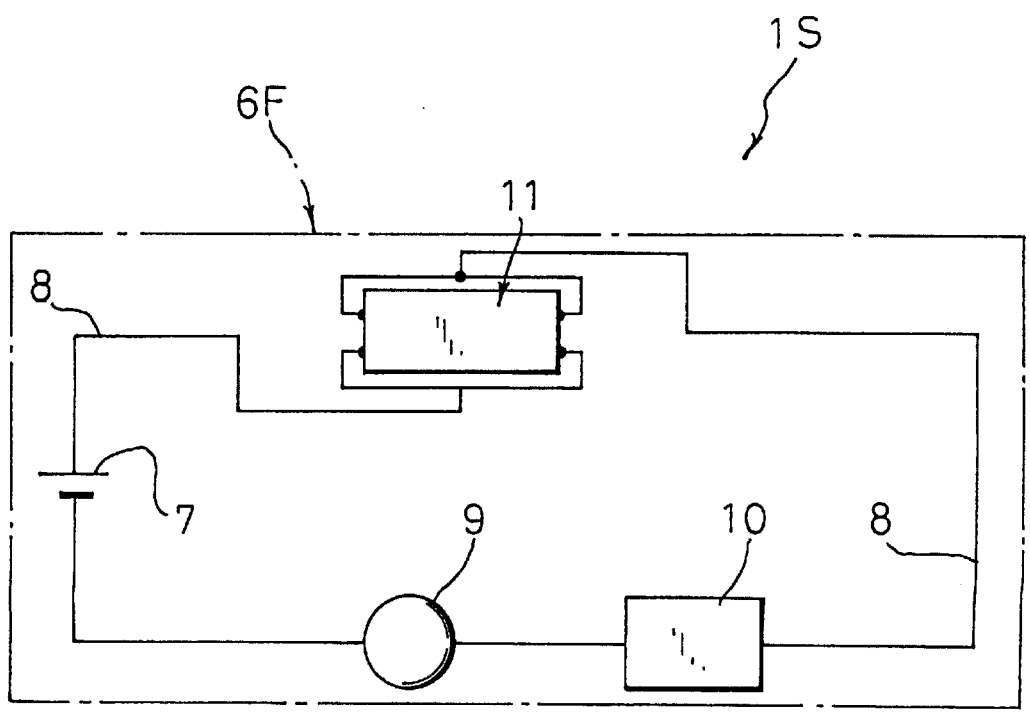
FIG. 57 is a block diagram showing the twentieth embodiment of the present invention.

A twentieth embodiment of the present invention is shown in FIGS. 55 to 57. It is distinguished from the first embodiment by the fact that the case body 6 is replaced with another case body 6F having a connector 27 formed in a shape of a cap, a plurality of fragments to attach by sandwiching, the connector made of elastic material or the like. The connector 27 is formed integrally or separately with the case body 6F, and the connector 27 takes advantage of elasticity to attach to an air valve 28 of the wheel of a car 2 in this embodiment. An indication device 1S according to the twentieth embodiment provides function similar to the first embodiment.

As set forth above, the indication device of the present invention is suitable for using with attached to the wheel of the bicycle or attached to a neck of dog, crutch, wheelchair, stick, umbrella, baby carriage or the like via a fitting by using a bolt or belt. Also it can be used in solar battery as a power source. Further, the indication device is suitable for using with being attached to the foldable-shaped case by hand, or using as a key-holder. In addition, it is suitable for using while being attached to the wheel of vehicle by using a wind-force generator or while floating when fishing.

What is claimed is:

1. An indication device for mounting on a movable object comprising:
    a case body for mounting on the movable object by one of a two-sided adhesive tape and a fitting;
    a power source provided in the case body;
    a luminous body provided in the case body for emitting one of a constant light and a blinking light by using electric current generated in the power source;
    a first ON/OFF switch for turning on automatically during use in response to movement of the movable object;
    a second ON/OFF switch including an optical sensor for turning on automatically when no light is received by the optical sensor; and
    said first ON/OFF switch and said second ON/OFF switch interconnecting said power source and said luminous body.

2. The indication device according to claim 1, wherein said fitting is one of a belt and a suspending member.

3. The indication device according to claim 1, further comprising a connector, wherein said case body is formed with said connector one of integrally and separately.

4. The indication device according to claim 1, wherein said power source is a battery.

5. The indication device according to claim 1, wherein said power source is one of a solar battery and a wind-force generator.

6. An indication device according to claim 1, wherein said luminous body is a Light Emitting Diode.

7. The indication device according to claim 1, wherein said luminous body includes a flow rating circuit.

8. The indication device according to claim 1, wherein said first ON/OFF switch turns on automatically by oscillating of a movable contact during use.

9. The indication device according to claim 1, further comprising a power rating circuit electrically connected between the first ON/OFF switch and the second ON/OFF switch.

10. The indication device according to claim 1, wherein the first ON/OFF switch is turned on when a centrifugal force acts on the first ON/OFF switch.

11. The indication device according to claim 1, further comprising a blinking circuit electrically connected between the first ON/OFF switch and the second ON/OFF switch.

12. The indication device according to claim 1, wherein the case body floats.

13. The indication device according to claim 12, wherein the luminous body is activated when the case body is pulled under water.

14. An indication device comprising:
    a case body having at least one outward projection;
    a power source provided in the case body;
    a luminous body provided in the case body for emitting one of a constant light and a blinking light by using electric current generated in the power source;
    a first ON/OFF switch;
    a second ON/OFF switch including an optical sensor for turning on automatically when no light is received by the optical sensor; and
    said first ON/OFF switch and said second ON/OFF switch interconnecting said power source and said luminous body.

15. The indication device according to claim 14, wherein said power source is a battery.

16. The indication device according to claim 14, wherein said luminous body is a Light Emitting Diode.

17. The indication device according to claim 14, wherein said luminous body includes a flow rating circuit.

18. The indication device according to claim 14, wherein said first ON/OFF switch turns on automatically by oscillating of a movable contact during use.

19. The indication device according to claim 14, wherein the first ON/OFF switch turns on automatically when the case body is gripped by hand.

20. An indication device comprising:
    a case body;
    a power source provided in the case body;
    a luminous body provided in the case body for emitting one of a constant light and a blinking light by using electric current generated in the power source;
    an ON/OFF switch including an optical sensor for turning on automatically when no light is received by the optical sensor; and
    said power source and said luminous body being electrically interconnected by the ON/OFF switch.

21. The indication device according to claim 20, further comprising a second ON/OFF switch turning on automatically during use and being electrically connected between said power source and said first ON/OFF switch.

* * * * *